(12) United States Patent
Takahashi et al.

(10) Patent No.: US 10,615,895 B2
(45) Date of Patent: Apr. 7, 2020

(54) TRANSMITTING APPARATUS, TRANSMITTING METHOD, RECEIVING APPARATUS, AND RECEIVING METHOD

(71) Applicant: SONY SEMICONDUCTOR SOLUTIONS CORPORATION, Atsugi-shi (JP)

(72) Inventors: Kazuyuki Takahashi, Chiba (JP); Lachlan Bruce Michael, Saitama (JP)

(73) Assignee: SONY SEMICONDUCTOR SOLUTIONS CORPORATION, Atsugi-shi (JP)

( * ) Notice: Subject to any disclaimer, the term of this patent is extended or adjusted under 35 U.S.C. 154(b) by 0 days.

(21) Appl. No.: 16/300,244

(22) PCT Filed: Jun. 16, 2017

(86) PCT No.: PCT/JP2017/022249
§ 371 (c)(1),
(2) Date: Nov. 9, 2018

(87) PCT Pub. No.: WO2018/003542
PCT Pub. Date: Jan. 4, 2018

(65) Prior Publication Data
US 2019/0158199 A1    May 23, 2019

(30) Foreign Application Priority Data

Jun. 30, 2016    (JP) ................................ 2016-129603

(51) Int. Cl.
*H04H 20/33*    (2008.01)
*H04H 20/28*    (2008.01)
(Continued)

(52) U.S. Cl.
CPC ............ *H04H 20/33* (2013.01); *H04H 20/28* (2013.01); *H04H 60/42* (2013.01); *H04H 60/43* (2013.01); *H04N 21/2362* (2013.01)

(58) Field of Classification Search
None
See application file for complete search history.

(56) References Cited

U.S. PATENT DOCUMENTS

2013/0291046 A1* 10/2013 Ko ...................... H04N 21/84
725/116
2016/0211931 A1   7/2016 Takahashi et al.
(Continued)

FOREIGN PATENT DOCUMENTS

EP      2 146 452 A2    1/2010
JP      2012-15930 A    1/2012
(Continued)

OTHER PUBLICATIONS

Extended European Search Report dated Mar. 7, 2019 in European Application 17819902.2, 8 pages.
(Continued)

*Primary Examiner* — Mohammed Rachedine
(74) *Attorney, Agent, or Firm* — Oblon, McClelland, Maier & Neustadt, L.L.P.

(57) ABSTRACT

The present technology relates to a transmitting apparatus, a transmitting method, a receiving apparatus, and a receiving method that facilitate tuning setting.
A transmitting apparatus generates and transmits transmission data including an index in data of a physical layer, the index being associated with predetermined processing-related information in a relation table in which processing-related information related to setting processing of tuning on a receiving side is registered in association with an index representing a region to be subjected to the setting processing corresponding to the processing-related information and
(Continued)

provided as being included in data of an upper layer higher than the physical layer. A receiving apparatus acquires the relation table, while receiving the transmission data, and acquires the index included in the data of the physical layer from the transmission data. Then, the receiving apparatus executes setting processing corresponding to the processing-related information associated with the index included in the data of the physical layer in the relation table. The present technology can be applied to, for example, setting of tuning, such as television broadcasting.

10 Claims, 29 Drawing Sheets

(51) Int. Cl.
*H04H 60/43* (2008.01)
*H04H 60/42* (2008.01)
*H04N 21/2362* (2011.01)

(56) References Cited

U.S. PATENT DOCUMENTS

| | | | |
|---|---|---|---|
| 2016/0234867 A1* | 8/2016 | Kwak | H04W 4/06 |
| 2017/0201337 A1 | 7/2017 | Michael et al. | |
| 2018/0063561 A1* | 3/2018 | Kwon | H04N 21/2343 |

FOREIGN PATENT DOCUMENTS

| | | |
|---|---|---|
| JP | 2015-80172 A | 4/2015 |
| WO | WO 2016/006472 A1 | 1/2016 |

OTHER PUBLICATIONS

International Search Report dated Aug. 29, 2017 in PCT/JP2017/022249 filed on Jun. 16, 2017.

* cited by examiner

FIG. 3

*(Figure rotated 180°; reading normally:)*

Vertical axis: OFDM SYMBOL NUMBER (0, 1, 2, 3, 4, 5, 6, 7, ..., 203)
Horizontal axis: CARRIER NUMBER (0, 1, 2, ..., 107)

- Carrier 0: CP
- Carrier 1: $S_{0,0}, S_{0,1}, S_{0,2}, S_{0,3}, S_{0,4}, S_{0,5}, S_{0,6}, S_{0,7}, \ldots, S_{0,203}$
- Carrier 2: $S_{1,0}, S_{1,1}, S_{1,2}, S_{1,3}, S_{1,4}, S_{1,5}, S_{1,6}, S_{1,7}, \ldots, S_{1,203}$
- ... TMCC ...
- ... AC (AC1, AC2) ...
- Carrier 107: $S_{95,0}, S_{95,1}, S_{95,2}, S_{95,3}, S_{95,4}, S_{95,5}, S_{95,6}, S_{95,7}, \ldots, S_{95,203}$

FIG. 8

| Syntax | No of Bits | Mnemonic | Semantics |
|---|---|---|---|
| EA_EXIST_FLAG | 1 | bslbf | FLAG INDICATING EXISTENCE OF INFORMATION |
| if(EA_EXIST_FLAG) { | | | |
| version | 8 | uimsbf | VERSION OF INFORMATION |
| NUM_EA_MESSAGE | 8 | bslbf | NUMBER OF DISASTER TYPE CODES |
| for(i=0;i<NUM_EA_MESSAGE;i++) { | | | |
| EA_code | 8 | uimsbf | DISASTER TYPE CODE |
| EA_status | 2 | | EMERGENCY ALERT STATUS |
| location_type | 3 | bslbf | REGION CODE TYPE |
| location_length | var | bslbf | REGION CODE LENGTH |
| location_code | var | uimsbf | REGION CODE |
| } | | | |
| } | | | |

FIG. 9

| EA_status | EMERGENCY ALERT STATUS |
|---|---|
| 0 | EMERGENCY ALERT STARTED |
| 1 | ALERT CONTINUING |
| 2 | ALERT ENDED |
| 3 | FUTURE RESERVATION |

FIG. 10

| location_type | MEANING OF VALUE | NUMBER OF BITS OF location_length | NUMBER OF BITS OF location_code |
|---|---|---|---|
| 0 | NATIONWIDE | — | — |
| 1 | PRESET PREFECTURE CODE | 0 BITS (NO NEED BECAUSE location_code IS 8 BITS) | 8bit |
| 2 | POSTAL CODE | 3 BITS (1 TO 7 DIGITS) | MAXIMUM 7 DIGITS x4bits=28bits (E.G., 141-0000) |
| 3 | SPECIFYING LATITUDE AND LONGITUDE COORDINATES | 4 BITS (1 TO 9 DIGITS) | MAXIMUM 9 DIGITS x4bitsx2(LAT/LONG) x2(START POINT, END POINT)=144bits (E.G., 035.427293, 139.360740) |
| 4-7 | FUTURE RESERVATION | — | — |

FIG. 11

JIS CODE FOR PREFECTURES IN JAPAN (JIS X0401)

| | | | | | |
|---|---|---|---|---|---|
| 1 | HOKKAIDO | 17 | ISHIKAWA | 33 | OKAYAMA |
| 2 | AOMORI | 18 | FUKUI | 34 | HIROSHIMA |
| 3 | IWATE | 19 | YAMANASHI | 35 | YAMAGUCHI |
| 4 | MIYAGI | 20 | NAGANO | 36 | TOKUSHIMA |
| 5 | AKITA | 21 | GIFU | 37 | KAGAWA |
| 6 | YAMAGATA | 22 | SHIZUOKA | 38 | EHIME |
| 7 | FUKUSHIMA | 23 | AICHI | 39 | KOCHI |
| 8 | IBARAKI | 24 | MIE | 40 | FUKUOKA |
| 9 | TOCHIGI | 25 | SHIGA | 41 | SAGA |
| 10 | GUNMA | 26 | KYOTO | 42 | NAGASAKI |
| 11 | SAITAMA | 27 | OSAKA | 43 | KUMAMOTO |
| 12 | CHIBA | 28 | HYOGO | 44 | OITA |
| 13 | TOKYO | 29 | NARA | 45 | MIYAZAKI |
| 14 | KANAGAWA | 30 | WAKAYAMA | 46 | KAGOSHIMA |
| 15 | NIIGATA | 31 | TOTTORI | 47 | OKINAWA |
| 16 | TOYAMA | 32 | SHIMANE | | |

FIG. 14

| Syntax | No of Bits | Mnemonic | Semantics |
|---|---|---|---|
| table_id | 8 | uimsbf | ID OF EMERGENCY ALERT TABLE |
| version | 8 | uimsbf | VERSION OF EMERGENCY ALERT TABLE |
| length | 8 | uimsbf | LENGTH OF EMERGENCY ALERT TABLE |
| NUM_EA_INFO | 8 | bslbf | NUMBER OF PIECES OF DISASTER TYPE INFORMATION |
| for(i=0; i<NUM_EA_INFO; i++) { | | | |
|   EA_code | 8 | uimsbf | DISASTER TYPE CODE |
|   EA_message_length | 16 | uimsbf | LENGTH OF EMERGENCY ALERT INFORMATION |
|   for(j=0; j<EA_message_length; j++) { | | | |
|     EA_message_data | 8 | | EMERGENCY ALERT INFORMATION |
|   } | | | |
| } | | | |

FIG. 15

| EA_code (DISASTER TYPE CODE) | EA_message_data (EMERGENCY ALERT INFORMATION) |
|---|---|
| 0 | EARTHQUAKE HAS JUST OCCURRED. PREPARE FOR TREMORS. |
| 1 | 1 SECOND TO ARRIVAL OF STRONG TREMORS. |
| 2 | 2 SECONDS TO ARRIVAL OF STRONG TREMORS. |
| 3 | 3 SECONDS TO ARRIVAL OF STRONG TREMORS. |
| 4 | 4 SECONDS TO ARRIVAL OF STRONG TREMORS. |
| 5 | 5 SECONDS TO ARRIVAL OF STRONG TREMORS. |
| 6 | 30mm OR MORE HEAVY RAINS ARE EXPECTED. |
| 7 | IN 10 MINUTES, 30mm OR MORE HEAVY RAINS ARE EXPECTED. |
| 8 | IN 15 MINUTES, 30mm OR MORE HEAVY RAINS ARE EXPECTED. |
| 9 | IN 20 MINUTES, 30mm OR MORE HEAVY RAINS ARE EXPECTED. |
| ... | |

FIG. 17

| Syntax | No of Bits | Mnemonic | Semantics |
|---|---|---|---|
| EA_EXIST_FLAG | 1 | bslbf | FLAG INDICATING EXISTENCE OF EMERGENCY ALERT INFORMATION |
| if(EA_EXIST_FLAG) { | | | |
| version | 8 | uimsbf | VERSION OF EMERGENCY ALERT INFORMATION |
| NUM_EA_MESSAGE | 8 | bslbf | NUMBER OF DISASTER TYPE CODES |
| for (i=0; i<NUM_EA_MESSAGE; i++) { | | | |
| EA_code | 8 | uimsbf | DISASTER TYPE CODE |
| EA_status | 2 | | EMERGENCY ALERT STATUS |
| } | | | |
| } | | | |

FIG. 18

| Syntax | No of Bits | Mnemonic | Semantics |
|---|---|---|---|
| table_id | 8 | uimsbf | ID OF EMERGENCY ALERT TABLE |
| version | 8 | uimsbf | VERSION OF EMERGENCY ALERT TABLE |
| length | 8 | uimsbf | LENGTH OF EMERGENCY ALERT TABLE |
| NUM_EA_INFO | 8 | bslbf | NUMBER OF PIECES OF DISASTER TYPE INFORMATION |
| for(i=0;i<NUM_EA_INFO;i++) { | | | |
|   EA_code | 8 | uimsbf | DISASTER TYPE CODE |
|   location_type | 8 | bslbf | REGION CODE TYPE |
|   location_length | var | uimsbf | SIGNIFICANT DIGITS OF REGION CODE |
|   location_code | var | uimsbf | REGION CODE |
|   EA_message_length | 16 | uimsbf | LENGTH OF EMERGENCY ALERT INFORMATION |
|   for(j=0;j<EA_message_length;j++) { | | | |
|     EA_message_data | 8 | | EMERGENCY ALERT INFORMATION |
|   } | | | |
| } | | | |

FIG. 21

| Syntax | No of Bits | Mnemonic | Semantics |
|---|---|---|---|
| location_exist_flag | 1 | bslbf | FLAG INDICATING EXISTENCE OF REGION CODE |
| if(location_exist_flag) { | | | |
|   location_code | 8 | uimsbf | REGION CODE |
| } | | | |

FIG. 22

| Syntax | No of Bits | Mnemonic | Semantics |
|---|---|---|---|
| table_id | 8 | uimsbf | ID OF TUNING INFORMATION TABLE |
| length | 8 | uimsbf | LENGTH OF TUNING INFORMATION TABLE |
| NUM_TUNE_INFO | 8 | bslbf | NUMBER OF PIECES OF TUNING INFORMATION |
| for (i=0; i<NUM_TUNE_INFO; i++) { | | | |
|   location_code | 8 | uimsbf | REGION CODE |
|   channel | 6 | uimsbf | CHANNEL FREQUENCY (CHANNEL NUMBER) |
|   protocol | 3 | uimsbf | PROTOCOL |
|   packet_type | 3 | uimsbf | DATA PACKET TYPE |
|   layer_fft_size | 2 | uimsbf | FFT SIZE |
|   layer_mod | 3 | uimsbf | MODULATION MODE |
|   layer_cod | 3 | uimsbf | FEC CODE RATE |
|   layer_gi | 3 | uimsbf | GUARD INTERVAL LENGTH |
|   message_length | 8 | uimsbf | Message LENGTH (E.G., NETWORK NAME) |
|   for (j=0; j<message_length; j++) { | | | |
|     message_data | 8 | bslbf | Message DATA |
|   } | | | |
| } | | | |

FIG. 23

| CHANNEL NUMBER | CENTER FREQUENCY MHz |
|---|---|
| 13 | 473 |
| 14 | 479 |
| 15 | 485 |
| 16 | 491 |
| 17 | 497 |
| 18 | 503 |
| 19 | 509 |
| : | |
| 61 | 761 |
| 62 | 767 |

FIG. 24

| protocol | PROTOCOL |
|---|---|
| 0 | ISDB-T |
| 1 | ISDB-T2 |
| 2..7 | Reserved |

FIG. 25

| packet_type | DATA TYPE |
|---|---|
| 0 | MPEG2-TS |
| 1 | TLV/MMT |
| 2..7 | Reserved |

FIG. 26

| layer_fft_size | FFT Size |
|---|---|
| 0 | 8K |
| 1 | 16K |
| 2 | 32K |
| 3 | reserved |

FIG. 27

| layer_mod | Modulation |
|---|---|
| 0 | QPSK |
| 1 | 16QAM |
| 2 | 64QAM |
| 3 | 256QAM-NUC |
| 4 | 1024QAM-NUC |
| 5 | 4096QAM-NUC |
| 6..7 | Reserved |

FIG. 28

| layer_cod | Code Rate |
|---|---|
| 0 | 1/2 |
| 1 | 2/3 |
| 2 | 3/4 |
| 3 | 5/6 |
| 4 | 7/8 |
| 5..7 | Reserved |

FIG. 29

| layer_gi | Guard Interval |
|---|---|
| 0 | 1/4 |
| 1 | 1/8 |
| 2 | 1/16 |
| 3 | 1/32 |
| 4..7 | Reserved |

FIG. 30

| location_code | channel | protocol | packet_type | layer_fft_size | layer_mod | layer_cod | layer_gi | message_data |
|---|---|---|---|---|---|---|---|---|
| 0 | 13 | 0 | 0 | 0 | 2 | 2 | 2 | "Channel1" |
| 0 | 14 | 0 | 0 | 0 | 0 | 0 | 1 | "Channel2" |
| 0 | 15 | 1 | 1 | 2 | 3 | 3 | 2 | "Channel3" |
| 0 | 16 | 1 | 1 | 2 | 3 | 4 | 3 | "Channel4" |
| 1 | 20 | 0 | 0 | 0 | 2 | 2 | 2 | "Channel1" |
| 1 | 21 | 0 | 0 | 0 | 0 | 0 | 1 | "Channel2" |
| 1 | 22 | 1 | 1 | 2 | 3 | 3 | 2 | "Channel3" |
| 2 | 13 | 0 | 0 | 0 | 2 | 2 | 2 | "Channel1" |
| 2 | 15 | 1 | 1 | 2 | 3 | 3 | 2 | "Channel3" |
| 3 | 20 | 0 | 0 | 0 | 2 | 2 | 2 | "Channel1" |
| 3 | 21 | 1 | 1 | 2 | 3 | 3 | 2 | "Channel3" |
| 3 | 22 | 1 | 1 | 2 | 3 | 4 | 3 | "Channel4" |

TRANSMITTING APPARATUS, TRANSMITTING METHOD, RECEIVING APPARATUS, AND RECEIVING METHOD

TECHNICAL FIELD

The present technology relates to a transmitting apparatus, a transmitting method, a receiving apparatus, and a receiving method. More particularly, the present technology relates to a transmitting apparatus, a transmitting method, a receiving apparatus, and a receiving method that facilitate, for example, tuning setting.

BACKGROUND ART

In one example, the Integrated Services Digital Broadcasting (ISDB) defines division of a physical channel, which is a frequency band of about 6 MHz in the ultra-high frequency (UHF) band, into 13 segments and performs partial reception, that is, uses 1 segment in the center of 13 segments to perform one-segment broadcasting for mobile terminals, and the like (hereinafter also referred to as One-Seg broadcasting) (e.g., see Non-Patent Document 1).

In a tuner for One-Seg broadcasting, for example, which is built in a mobile terminal, such as a cellular phone, a tuning information table in which tuning information necessary for setting tuning of television broadcasting is registered in each region is stored in the mobile terminal in advance.

In the mobile terminal, for example, when the user designates a region of the current location, tuning information (tuning information necessary for setting tuning in that region) is acquired from the tuning information table. Using the tuning information, for example, the tuning setting processing necessary for tuning, such as association between the channel number and the reception frequency, is performed.

CITATION LIST

Patent Document

Non-Patent Document

Non-Patent Document 1: ARIB STD-B31, version 2.2, Association of Radio Industries and Businesses

SUMMARY OF THE INVENTION

Problems to be Solved by the Invention

Now, when the user moves from the current position, the user needs to designate, in the region after the movement, the region after the movement and let the mobile terminal perform processing for tuning setting.

In addition, the tuning information table stored in advance in the mobile terminal cannot be updated by television broadcasting, so that when, for example, the tuning information, such as association between the channel number of the television broadcasting and the receiving frequency is updated, it might be difficult to receive (tune) television broadcast even if the user designates a predetermined channel number.

The present technology has been made in view of such a situation, and is intended to facilitate tuning setting.

Solutions to Problems

A transmitting apparatus of the present technology includes a generating unit configured to generate transmission data including an index in data of a physical layer, the index being associated with predetermined processing-related information in a relation table in which processing-related information related to setting processing of tuning on a receiving side is registered in association with an index representing a region to be subjected to the setting processing corresponding to the processing-related information and provided as being included in data of an upper layer higher than the physical layer, and a transmitting unit configured to transmit the transmission data.

A transmitting method of the present technology includes generating transmission data including an index in data of a physical layer, the index being associated with predetermined processing-related information in a relation table in which processing-related information related to setting processing of tuning on a receiving side is registered in association with an index representing a region to be subjected to the setting processing corresponding to the processing-related information and provided as being included in data of an upper layer higher than the physical layer, and transmitting the transmission data.

In the transmitting apparatus and the transmitting method of the present technology, the transmission data including the index in data of the physical layer is generated and transmitted, the index being associated with the predetermined processing-related information in the relation table in which the processing-related information related to setting processing of tuning on the receiving side is registered in association with the index representing the region to be subjected to the setting processing corresponding to the processing-related information and provided as being included in data of the upper layer higher than the physical layer.

A receiving apparatus of the present technology includes a relation table acquiring unit configured to acquire a relation table in which processing-related information related to setting processing of tuning on a receiving side is registered in association with an index representing a region to be subjected to the setting processing corresponding to the processing-related information and provided as being included in data of an upper layer higher than a physical layer, a receiving unit configured to receive transmission data including an index in data of a physical layer, the index being associated with the predetermined processing-related information in the relation table, an index acquiring unit configured to acquire the index included in the data of the physical layer from the transmission data, and a processing execution unit configured to execute the setting processing corresponding to the processing-related information associated with the index included in the data of the physical layer in the relation table.

A receiving method of the present technology, includes acquiring a relation table in which processing-related information related to setting processing of tuning on a receiving side is registered in association with an index representing a region to be subjected to the setting processing corresponding to the processing-related information and provided as being included in data of an upper layer higher than a physical layer, receiving transmission data including an index in data of a physical layer, the index being associated with the predetermined processing-related information in the relation table, acquiring the index included in the data of the physical layer from the transmission data, and executing the setting processing corresponding to the processing-related information associated with the index included in the data of the physical layer in the relation table.

In the receiving apparatus and the receiving method of the present technology, the relation table in which the processing-related information related to the setting processing of tuning on the receiving side is registered in association with the index representing the region to be subjected to the setting processing according to the processing-related information, and the processing-related information is included in the data of the upper layer higher than the physical layer, is provided, the transmission data including the index associated with predetermined processing-related information in the data of the physical layer in the relation table is received, and the index included in the data of the physical layer from the transmission data is acquired. Then, in the relation table, the setting processing corresponding to the processing-related information associated with the index included in the data of the physical layer is executed.

It should be noted that the transmitting apparatus and the receiving apparatus may be independent apparatuses or may be internal blocks constituting a single apparatus.

In addition, the transmitting apparatus and the receiving apparatus can be realized by causing a computer to execute a program. The program can be provided by transferring the program via a transmission medium or recording the program in a recording medium.

Effects of the Invention

According to the present technology, the setting of tuning is performed easily.

It should be noted that the effects listed herein are not limiting, and any one effect disclosed herein may be obtained.

BRIEF DESCRIPTION OF DRAWINGS

FIG. 3 illustrates OFDM segments in ISDB-T.

FIG. 8 illustrates an example of syntax for processing index information including a processing index associated with processing-related information related to output processing for outputting an emergency alert.

FIG. 9 is a diagram for explaining EA_status.

FIG. 10 is a diagram for explaining location_type.

FIG. 11 illustrates a correspondence relationship between prefecture region codes defined in JIS X0401 and prefectures represented by the prefecture region codes.

FIG. 14 illustrates an example of syntax of a relation table in which processing-related information related to output processing for outputting an emergency alert is registered.

FIG. 15 illustrates an example of emergency alert information, EA_message_data, as processing-related information.

FIG. 17 illustrates another example of the syntax of processing index information for emergency alert.

FIG. 18 illustrates another example of the syntax of the emergency alert table as the relation table.

FIG. 21 illustrates an example of the syntax of processing index information including the processing index associated with the processing-related information related to setting processing for tuning setting.

FIG. 22 illustrates an example of the syntax of a relation table in which tuning information is registered as processing-related information related to setting processing for tuning setting.

FIG. 23 illustrates an example of relationship between a channel number and a (center) frequency of a channel.

FIG. 24 is a diagram for explaining an example of protocol.

FIG. 25 is a diagram for explaining an example of packet_type.

FIG. 26 is a diagram for explaining an example of layer_fft_size.

FIG. 27 is a diagram for explaining an example of layer_mod.

FIG. 28 is a diagram for explaining an example of layer_cod.

FIG. 29 is a diagram for explaining an example of layer_gi.

FIG. 30 illustrates an example of a region code, location_code, as a processing index registered in a tuning information table and tuning information associated with the region code, location_code.

MODE FOR CARRYING OUT THE INVENTION

Embodiment of Transmission System to which Present Technology is Applied

Figure 1:
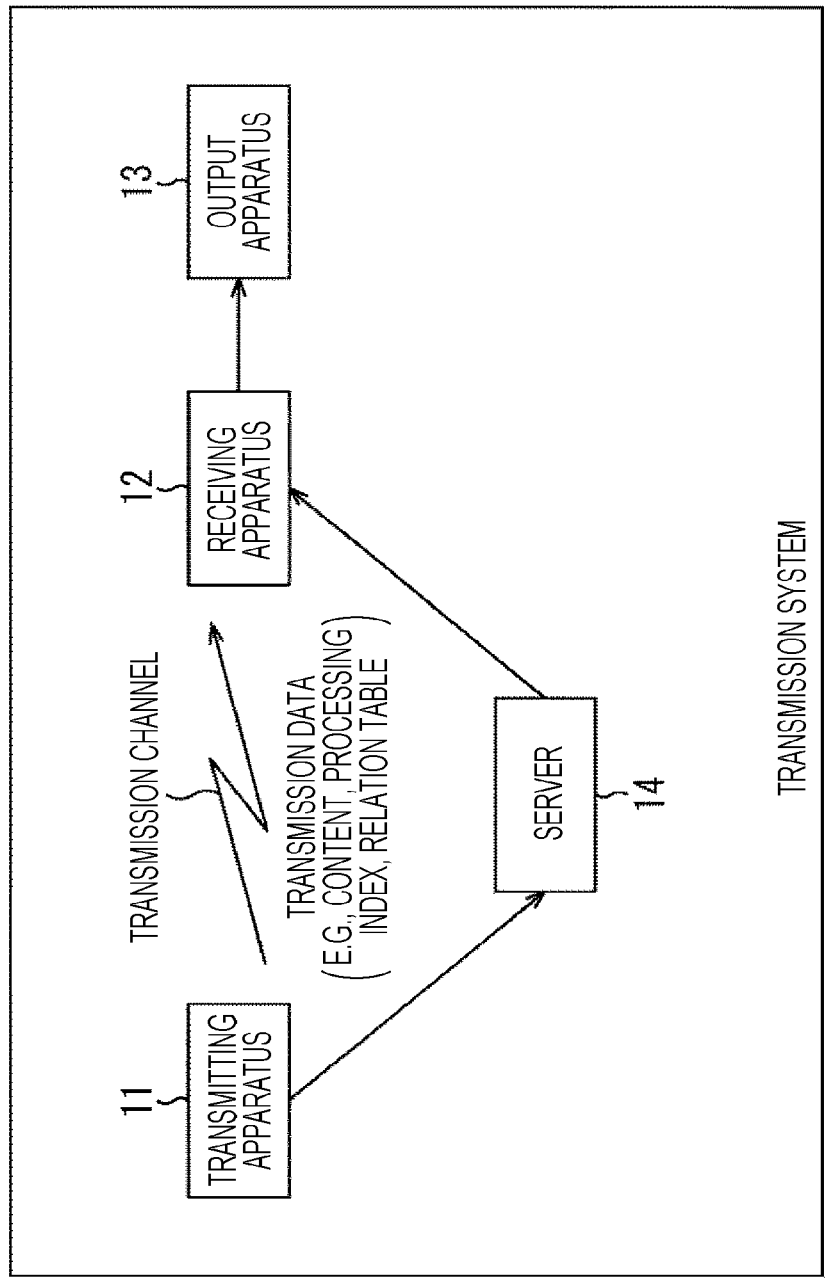
FIG. 1 is a block diagram illustrating a configuration example of a transmission system to which the present technology is applied according to an embodiment.

FIG. 1 is a block diagram illustrating a configuration example of a transmission system to which the present technology is applied (a system refers to a group of a plurality of apparatuses logically gathered, regardless of whether or not the apparatuses of each configuration are in the same casing).

In FIG. 1, the transmission system includes a transmitting apparatus 11, a receiving apparatus 12, an output apparatus 13, and a server 14.

The transmitting apparatus 11 sends (or broadcasts or transmits), for example, television broadcast programs and the like. In other words, the transmitting apparatus 11 takes, for example, content of the program, such as image data or audio data, as target data for transmission, and performs transmission processing necessary for the target data. The transmitting apparatus 11 transmits the transmission data, which is obtained by performing the transmission processing on the target data, through a transmission line, such as a satellite line, a terrestrial wave, a cable (a wired line), or the like.

The transmission data transmitted by the transmitting apparatus 11 includes a processing index in addition to the content of the program. Further, the transmission data includes a relation table, as necessary.

Here, in the relation table, processing-related information related to processing on the receiving side, that is, processing performed in the receiving apparatus 12 is registered in association with the processing index. The processing index is an index associated with the processing-related information.

The processing index is included in the data of a physical layer of the transmission data. The relation table is included in the data of the upper layer higher than the physical layer of the transmission data, as necessary. The content of the program is data of the application layer, and the relation table can be included in the data of the application layer similarly to the content of the program, or can be included in other upper layer data.

The receiving apparatus 12 receives the transmission data transmitted from the transmitting apparatus 11 via the transmission line, restores the content of the program included in the transmission data, and supplies the content to the output apparatus 13.

In addition, the receiving apparatus 12 acquires the relation table included in the data of the upper layer of the transmission data and a processing index included in the data of the physical layer of the transmission data, and executes processing (hereinafter also referred to as related processing) corresponding to the processing-related information associated with the processing index included in the data of the physical layer in the relation table.

The output apparatus 13 includes a display for displaying images and a speaker for outputting voice and sound (sound), displays images as content etc. from the receiving apparatus 12, and outputs sound.

The server 14 is, for example, a web server, and acquires the relation table, if necessary, from the transmitting apparatus 11 or the like. Further, the server 14 lets the relation table be included in the upper layer data (e.g., data such as Hypertext Transfer Protocol (HTTP) data) and provides the data in the upper layer to the receiving apparatus 12 by communication via the Internet.

As described above, the relation table can be provided as being included in the data of the upper layer of the transmission data transmitted by the transmitting apparatus 11, and can also be provided as being included in the data of the upper layer from the server 14.

The receiving apparatus 12 can acquire the relation table provided as being included in the data of the upper layer of the transmission data transmitted by the transmitting apparatus 11, and also provided as being included in the data of the upper layer from the server 14.

The relation table may be provided from both the transmitting apparatus 11 and the server 14, or may be provided only from either the transmitting apparatus 11 or the server 14.

To simplify the explanation, it is assumed, in the following description, that the relation table is provided by, for example, being included in the data of the upper layer of the transmission data from the transmitting apparatus 11 to the receiving apparatus 12.

Hereinafter, the data of the physical layer and the data of the upper layer are also referred to as the physical layer data and upper layer data, respectively.

<Configuration Example of Transmitting Apparatus 11>

Figure 2:
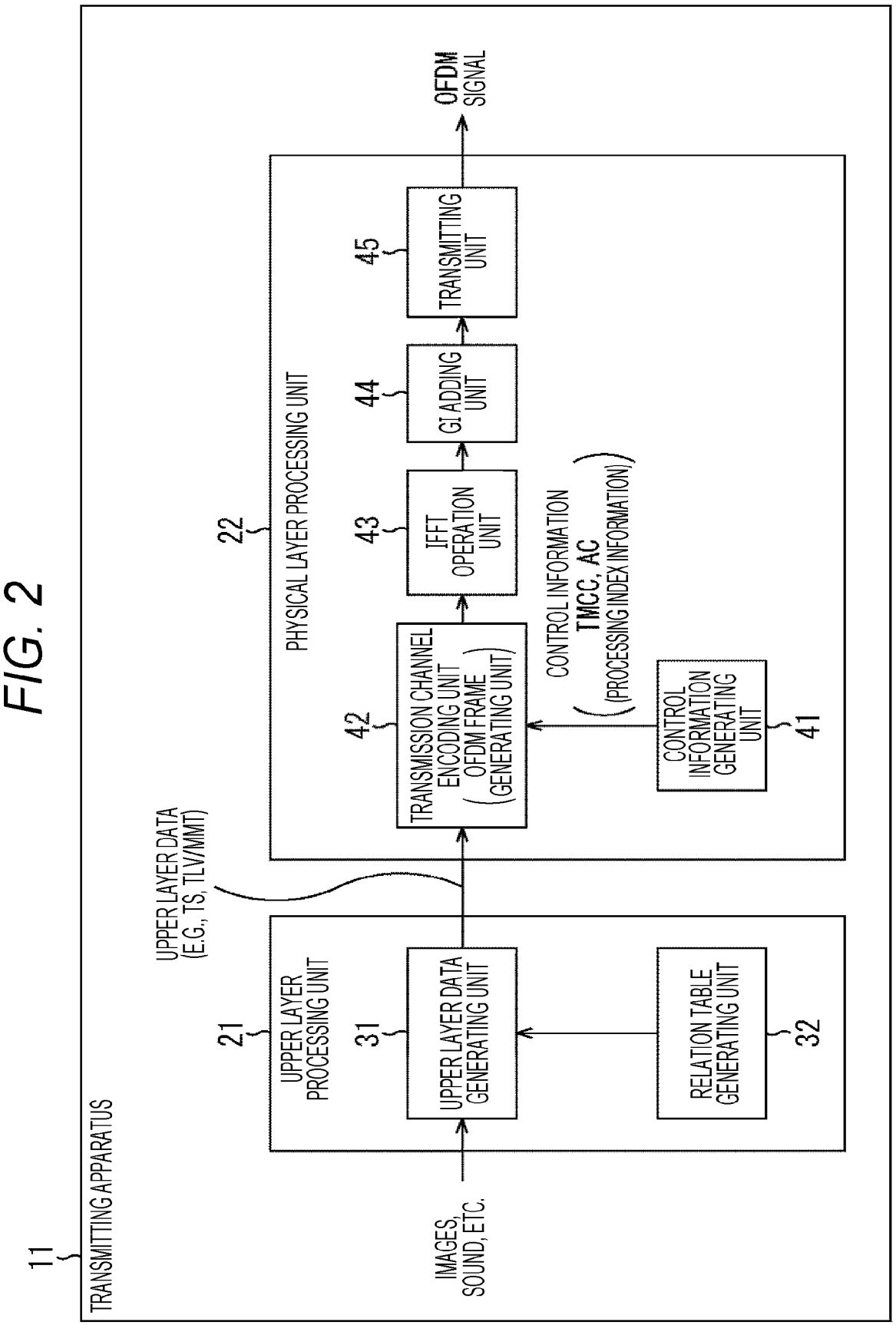
FIG. 2 is a block diagram illustrating a configuration example of a transmitting apparatus 11.

FIG. 2 is a block diagram illustrating a configuration example of a transmitting apparatus 11 in FIG. 1.

In FIG. 2, the transmitting apparatus 11 is a transmitting apparatus using, for example, the transmission method of ISDB-T, and includes an upper layer processing unit 21 and a physical layer processing unit 22.

The upper layer processing unit 21 receives images, sounds, and the like of program content.

The upper layer processing unit 21 performs processing of an upper layer that generates upper layer data of a format defined by an upper layer from the images, sounds, and the like of the program content and supplies the processed upper layer to the physical layer processing unit 22.

In other words, the upper layer processing unit 21 includes an upper layer data generating unit 31 and a relation table generating unit 32.

The upper layer data generating unit 31 receives images, sounds, and the like of the program content and also receives a relation table from the relation table generating unit 32.

The upper layer data generating unit 31 encodes images and sounds of the program content, for example, generates upper layer data including the encoded images and sounds, as well as the relation table and the like from the relation table generating unit 32, and supplies the upper layer data to the physical layer processing unit 22.

As the upper layer data, a stream such as Transport Stream (TS), Type Length Value (TLV)/MPEG Media Transport (MMT) or the like can be adopted.

The relation table generating unit 32 generates a relation table in which the processing index and the processing-related information are associated with each other, and supplies the relation table to the upper layer data generating unit 31.

The physical layer processing unit 22 performs processing of the physical layer on the upper layer data from the upper layer processing unit 21, and transmits resulting transmission data, for example, an orthogonal frequency division multiplexing (OFDM) signal.

In other words, the physical layer processing unit 22 includes a control information generating unit 41, a transmission channel encoding unit 42, an inverse fast fourier transform (IFFT) operation unit 43, a guard interval (GI) adding unit 44, and a transmitting unit 45.

The control information generating unit 41 generates physical layer data as control information. For example, in ISDB-T, a transmission and multiplexing configuration and control (TMCC) signal and an AC signal are physical layer data as control information. In Non-Patent Document 1, it should be noted that the TMCC signal is treated as control information and the AC signal is treated as additional information. In order to simplify the explanation, however, in the present specification, both the TMCC signal and the AC signal are referred to as control information.

The control information generating unit 41 generates processing index information including a processing index associated with predetermined processing-related information registered in the relation table generated by the relation table generating unit 32 as part of the control information.

The control information generating unit 41 supplies the physical layer data as the control information to the transmission channel encoding unit 42.

The transmission channel encoding unit 42 receives, in addition to the control information from the control information generating unit 41, the upper layer data from (the upper layer data generating unit 31 of) the upper layer processing unit 21.

The transmission channel encoding unit 42 performs predetermined transmission channel encoding on the upper layer data from the upper layer processing unit 21, and adds control information from the control information generating unit 41 and a necessary pilot signal to the upper layer data as the physical layer data to generate an OFDM frame.

Therefore, the transmission channel encoding unit 42 functions as an OFDM frame generating unit that generates OFDM frames.

Here, for example, in the ISDB-T transmission channel encoding, for example, error correction encoding of upper layer data, mapping as modulation of subcarriers (mapping of upper layer data onto IQ constellation), frequency Interleaving, time interleaving, addition of control information and pilot signals, and the like are performed, whereby 13 OFDM segments are formed Then, the thirteen OFDM segments form one OFDM frame.

After generating the OFDM frame, the transmission channel encoding unit 42 supplies the OFDM frame to the IFFT operation unit 43.

The IFFT operation unit 43 performs IFFT on the OFDM frame supplied from the transmission channel encoding unit 42 as the signal in the frequency domain to convert the signal in the frequency domain into the OFDM frame in the time domain, and supplies the OFDM frame to the GI adding unit 44.

The GI adding unit 44 adds a GI having a length equal to a fraction of an integer of the symbol length of the OFDM symbol to each OFDM symbol forming the OFDM frame in the time domain from the IFFT operation unit 43, and supplies the OFDM signal as the transmission data to the transmitting unit 45.

The transmitting unit 45 performs frequency conversion of the transmission data from the GI adding unit 44, and transmits the OFDM signal as transmission data after the frequency conversion.

FIG. 3 illustrates OFDM segments of ISDB-T.

In the ISDB-T, three transmission modes of modes 1, 2, and 3 with different OFDM subcarrier intervals are defined. In addition, in the ISDB-T, four modulations such as quaternary phase shift keying (QPSK), 16 quadrature amplitude modulation (QAM), 64 QAM, and differential QPSK (DQPSK) are defined as subcarrier modulations.

FIG. 3 illustrates OFDM segments in which the transmission mode is mode 1 and the modulation is DQPSK.

In FIG. 3, the horizontal axis is a frequency axis representing subcarrier numbers (carrier numbers). A horizontal row represents an OFDM symbol. In addition, the vertical axis is a time axis representing the numbers of the OFDM symbol (OFDM symbol numbers).

204 OFDM symbols form one OFDM frame.

In FIG. 3, $S_{i,j}$ represents a data symbol (carrier symbol) of the subcarrier modulated in the upper layer data, and the OFDM segment (OFDM frame) is formed by adding a continual pilot (CP) which is a pilot signal, a TMCC signal, and an AC signal (subcarrier) to the data symbol.

The transmission channel encoding unit 42 of FIG. 2 can, for example, generate the OFDM frame or the like conforming to the OFDM frames including OFDM segments in FIG. 3.

In this case, the processing index information can be included in the TMCC signal or the AC signal as the physical layer data.

Figure 4:
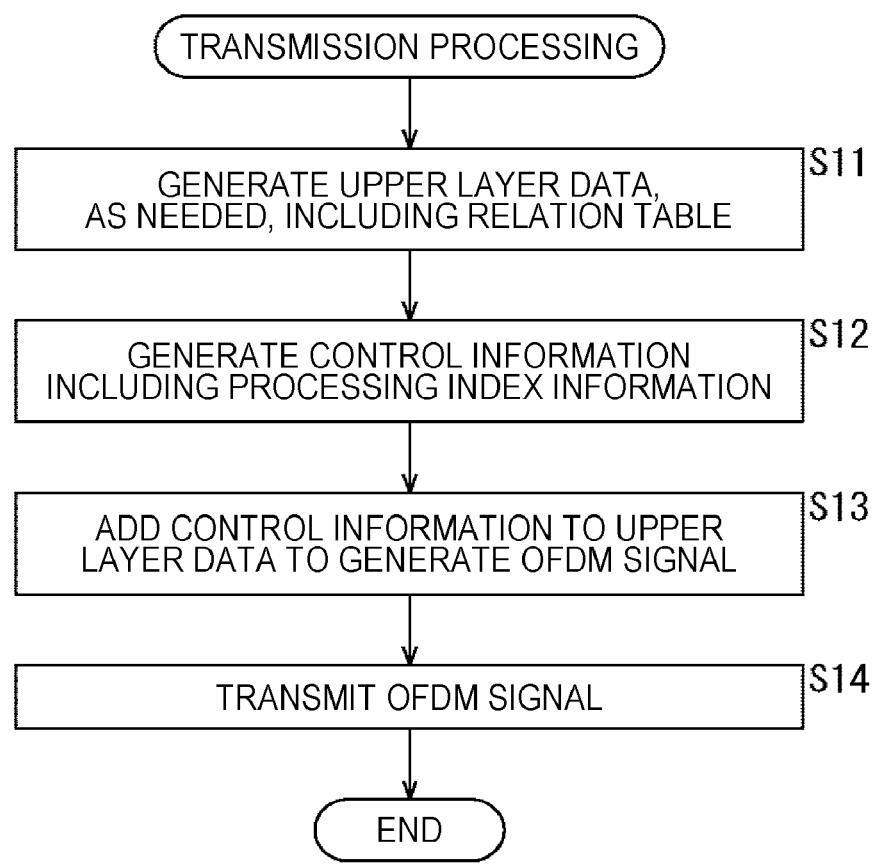
FIG. 4 is a flowchart for explaining transmission processing performed by the transmitting apparatus 11.

FIG. 4 is a flowchart for explaining a transmission processing performed by the transmitting apparatus 11 of FIG. 2.

In the transmission processing, the OFDM signal is generated as transmission data and transmitted.

Specifically, in step S11, the upper layer processing unit 21 generates upper layer data including the relation table and the like and supplies the generated upper layer data to the physical layer processing unit 22. The processing then proceeds to step S12.

In other words, in the upper layer processing unit 21, the relation table generating unit 32 generates the relation table in which the processing index and the processing-related information are associated with each other, and supplies the relation table to the upper layer data generating unit 31.

The upper layer data generating unit 31 encodes images and sounds of the program content, for example, and generates upper layer data including the encoded images and sounds, the relation table from the relation table generating unit 32, and the like, and supplies the upper layer data to the physical layer processing unit 22.

In step S12, the control information generating unit 41 generates control information including processing index information, and the processing proceeds to step S13.

In other words, the control information generating unit 41 generates processing index information including a processing index associated with predetermined processing-related information registered in the relation table generated by the relation table generating unit 32.

Further, the control information generating unit 41 generates, for example, control information (TMCC signal or AC signal) which is physical layer data, and includes processing index information as part of the control information.

In step S13, the physical layer processing unit 22 adds the control information, which is the physical layer data generated by the control information generating unit 41, to the upper layer data from the upper layer processing unit 21, and generates, for example, the OFDM signal as the transmission data. The processing then proceeds to step S14.

That is, in the physical layer processing unit 22, the transmission channel encoding unit 42 receives the upper layer data from the upper layer processing unit 21 and the control information that is physical layer data generated by the control information generating unit 41.

The transmission channel encoding unit 42 performs predetermined transmission channel encoding on the upper layer data from the upper layer processing unit 21, and adds control information from the control information generating unit 41 and a necessary pilot signal to the upper layer data as the physical layer data to generate an OFDM frame. The OFDM frame is supplied to the IFFT operation unit 43 from the transmission channel encoding unit 42.

The IFFT operation unit 43 performs IFFT of the OFDM frame from the transmission channel encoding unit 42, obtains the OFDM frame in the time domain, and supplies the OFDM frame to the GI adding unit 44.

The GI adding unit 44 adds the GI to each OFDM symbol that forms the OFDM frame in the time domain from the IFFT operation unit 43, forms the OFDM signal as transmission data, and supplies the OFDM signal to the transmitting unit 45.

In step S14, the transmitting unit 45 performs frequency conversion of the transmission data from the GI adding unit 44, and transmits the OFDM signal as the transmission data after the frequency conversion.

In the transmitting apparatus 11, the above transmission processing is repeatedly performed in a pipeline manner.

<Configuration Example of Receiving Apparatus 12>

Figure 5:
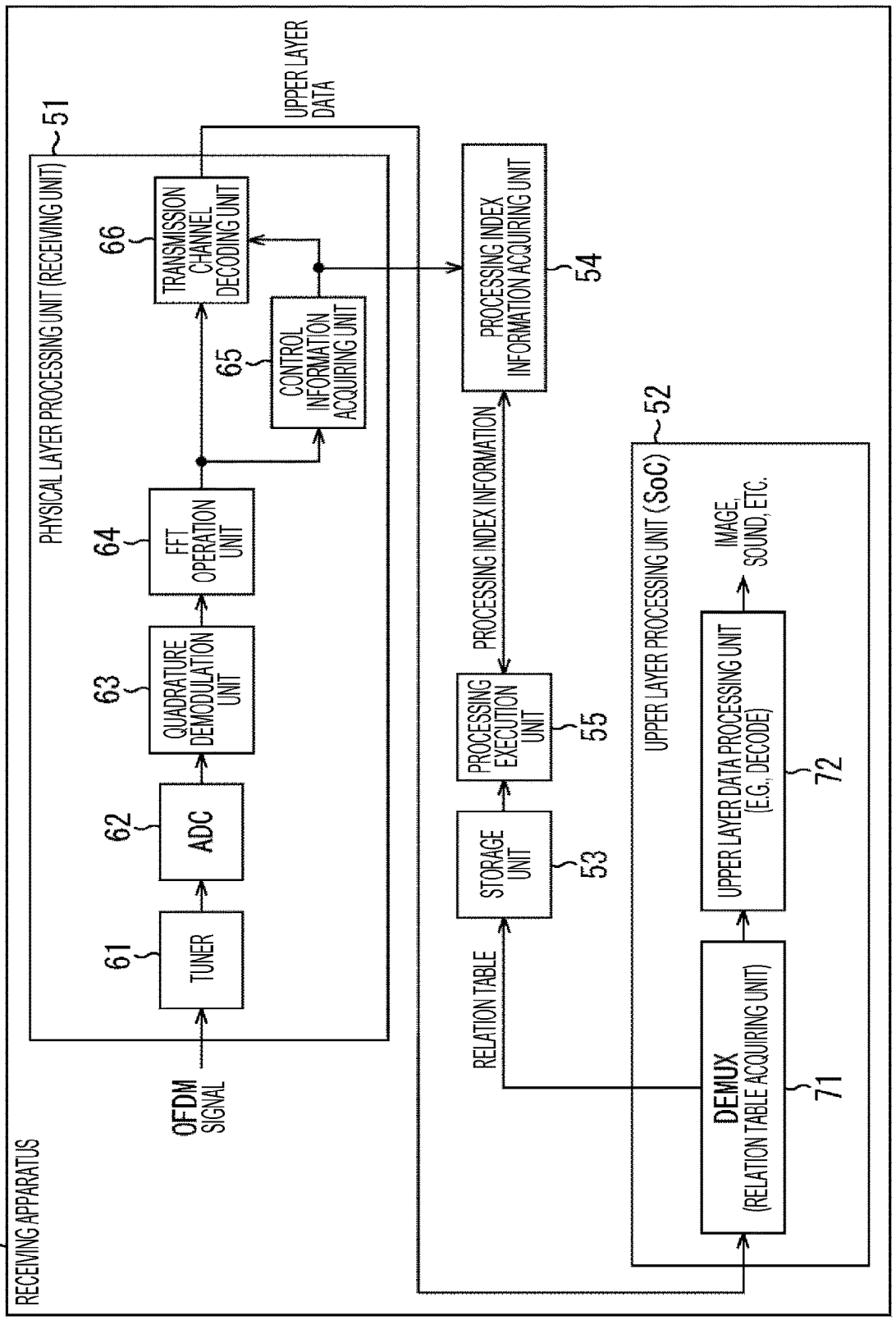
FIG. 5 is a block diagram of a configuration example of a receiving apparatus 12.

FIG. 5 is a block diagram of a configuration example of a receiving apparatus 12 in FIG. 1.

In FIG. 5, the receiving apparatus 12 uses, for example, the ISDB-T transmission system, and includes a physical layer processing unit 51, an upper layer processing unit 52, a storage unit 53, a processing index information acquiring unit 54, and a processing execution unit 55.

The physical layer processing unit 51 functions as a receiving unit that receives the OFDM signal as transmission data transmitted from the transmitting apparatus 11 and performs processing of the physical layer on the transmission data.

That is, the physical layer processing unit 51 includes a tuner 61, an analog to digital converter (ADC) 62, a quadrature demodulation unit 63, an FFT operation unit 64, a control information acquiring unit 65, and a transmission channel decoding unit 66.

The tuner 61 receives the OFDM signal as transmission data from a predetermined channel (frequency band) transmitted from the transmitting apparatus 11, and supplies the OFDM signal to the ADC 62.

The ADC 62 performs AD conversion of the OFDM signal as the transmission data from the tuner 61, and supplies the converted OFDM signal to the quadrature demodulation unit 63.

The quadrature demodulation unit 63 performs quadrature demodulation of the OFDM signal as the transmission data from the ADC 62 and supplies the demodulated OFDM signal to the FFT operation unit 64.

The FFT operation unit 64 performs FFT on the OFDM signal from the quadrature demodulation unit 63 as a signal in the time domain, converts the OFDM signal into the OFDM signal in the frequency domain, and supplies the converted OFDM signal to the control information acquiring unit 65 and the transmission channel decoding unit 66.

The control information acquiring unit 65 acquires, for example, a TMCC signal or an AC signal as control information which is the physical layer data from the OFDM signal from the FFT operation unit 64, and outputs such signals to the processing index information acquiring unit 54 and transmission channel decoding unit 66.

Using the control information supplied from the control information acquiring unit 65 as necessary, the transmission channel decoding unit 66 performs predetermined transmission channel decoding on the OFDM signal from the FFT operation unit 64 to restore the upper layer data and supply the restored upper layer data to the upper layer processing unit 52.

Here, in the transmission line decoding of ISDB-T, for example, time deinterleaving, frequency deinterleaving, demapping as demodulation of subcarriers, error correction decoding, and the like are performed, and upper layer data is restored, for example. For example, the TMCC signal as the control information includes information such as the modulation of the subcarrier, and the decoding of the transmission channel is performed using the TMCC signal, as necessary, as the control information supplied from the control information acquiring unit 65 to the transmission channel decoding unit 66.

The upper layer processing unit 52 is, for example, a system-on-chip (SoC) unit, and performs upper layer processing on the upper layer data from (the transmission channel decoding unit 66 of) the physical layer processing unit 51.

That is, the upper layer processing unit 52 includes a DEMUX 71 and an upper layer data processing unit 72.

The DEMUX 71 receives the upper layer data from the physical layer processing unit 51.

The DEMUX 71 separates the encoded images and sounds from the upper layer data from the physical layer processing unit 51, and supplies the separated images and sounds to the upper layer data processing unit 72.

In addition, the DEMUX 71 acquires a relation table from the upper layer data from the physical layer processing unit 51 by separating the relation table, and supplies the relation table to the storage unit 53.

Therefore, the DEMUX 71 functions as a relation table acquiring unit that acquires the relation table.

The upper layer data processing unit 72 decodes the encoded images and sounds from the DEMUX 71 and supplies the decoded images and sounds to the output apparatus 13 (FIG. 1).

The storage unit 53 stores the relation table supplied from the DEMUX 71.

The processing index information acquiring unit 54 acquires the processing index information included in the control information as the physical layer data from the control information acquiring unit 65, and supplies the processing index information to the processing execution unit 55.

The processing execution unit 55 refers to the relation table stored in the storage unit 53 and determines in the relation table the processing-related information associated with the processing index included in the processing index information from the processing index information acquiring unit 54, and obtains processing-related information as information of interest. Then, the processing execution unit 55 executes processing (related processing) according to the information of interest.

Here, when the power supply of the receiving apparatus 12 is turned off, the upper layer processing unit 52 that performs processing of the upper layer higher than the physical layer is turned off, but the physical layer processing unit 51 that performs the processing of the physical layer is not turned off and continues to execute the processing which is at least necessary for acquiring the control information.

In addition, in the receiving apparatus 12, the storage unit 53, the processing index information acquiring unit 54, and the processing execution unit 55 are not turned off, either, and continue to operate.

Therefore, even when the power of the receiving apparatus 12 is turned off, the control information acquiring unit 65 can acquire the control information which is the physical layer data, and the processing index information acquiring unit 54 can acquire the processing index information included in the control information which is the physical layer data. Further, the processing execution unit 55 can acquire, as the information of interest, the processing-related information associated with the processing index included in the processing index information acquired by the processing index information acquiring unit 54 in the relation table stored in the storage unit 53, and can execute related processing corresponding to the information of interest.

Figure 6:
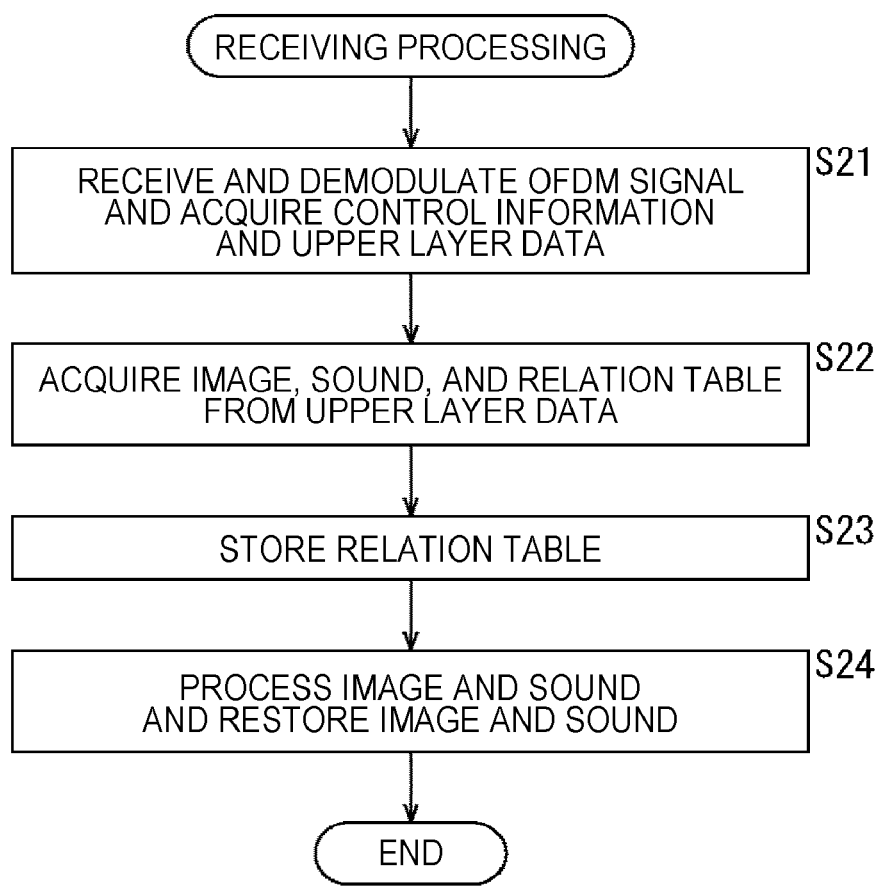
FIG. 6 is a flowchart for explaining reception processing performed by the receiving apparatus 12.

FIG. 6 is a flowchart for explaining the reception processing performed by the receiving apparatus 12 of FIG. 5.

In the reception processing, the OFDM signal is received as the transmission data, and the processing of the upper layer for acquiring the images and sounds included in the upper layer data included in the OFDM signal is performed.

Specifically, in step S21, the physical layer processing unit 51 receives and demodulates the OFDM signal as the transmission data transmitted from the transmitting apparatus 11, and acquires the control information, which is physical layer data, and the upper layer data. The processing then proceeds to step S22.

That is, in the physical layer processing unit 51, the tuner 61 receives the OFDM signal as the transmission data transmitted from the transmitting apparatus 11, and supplies the OFDM signal to the ADC 62. The ADC 62 performs AD conversion of the OFDM signal from the tuner 61 and supplies the converted OFDM signal to the quadrature demodulation unit 63. The quadrature demodulation unit 63 performs quadrature demodulation of the OFDM signal from the ADC 62 and supplies the demodulated OFDM signal to the FFT operation unit 64. The FFT operation unit 64 performs FFT of the OFDM signal from the quadrature demodulation unit 63 and supplies the OFDM signal after the FFT to the control information acquiring unit 65 and the transmission channel decoding unit 66.

The control information acquiring unit 65 acquires the control information that is the physical layer data from the OFDM signal from the FFT operation unit 64, and supplies the control information to the processing index information acquiring unit 54 and the transmission channel decoding unit 66.

The transmission channel decoding unit 66 performs transmission channel decoding on the OFDM signal from the FFT operation unit 64 using the control information from the control information acquiring unit 65 to restore the upper layer data and supplies the restored upper layer data to the upper layer processing unit 52.

In step S22, in the upper layer processing unit 52, the DEMUX 71 separates and acquires the encoded images and sounds and the relation table from the upper layer data from (the transmission channel decoding unit 66 of) the physical layer processing unit 51.

Then, the DEMUX 71 supplies the encoded images and sounds to the upper layer data processing unit 72, and also supplies the relation table to the storage unit 53. The processing then proceeds from step S22 to step S23.

In step S23, the storage unit 53 stores the relation table supplied from the DEMUX 71, and the processing proceeds to step S24. That is, the storage unit 53 updates the stored contents to the relation table supplied from the DEMUX 71. Therefore, when the relation table supplied in the past from the DEMUX 71 has already been stored in the storage unit 53, the storage content of the storage unit 53 is updated to the latest relation table supplied from the DEMUX 71.

In step S24, the upper layer data processing unit 72 restores the original images and sounds by performing processing, such as decoding of the encoded images and sounds from the DEMUX 71, and supplies the original images and sounds to the output apparatus 13 (FIG. 1).

In the receiving apparatus 12, the above reception processing is repeatedly performed in a pipeline manner.

Note that, in the receiving apparatus 12, all the reception processing is performed when the power is on.

In addition, in the receiving apparatus 12, when the power is turned off, at least the processing of the physical layer data in the receiving processing is performed. That is, in step S21, at least the processing of receiving and demodulating the OFDM signal as the transmission data transmitted from the transmitting apparatus 11, acquiring the control information as the physical layer data, and supplying the acquired control information to the processing index information acquiring unit 54 is performed.

Figure 7:
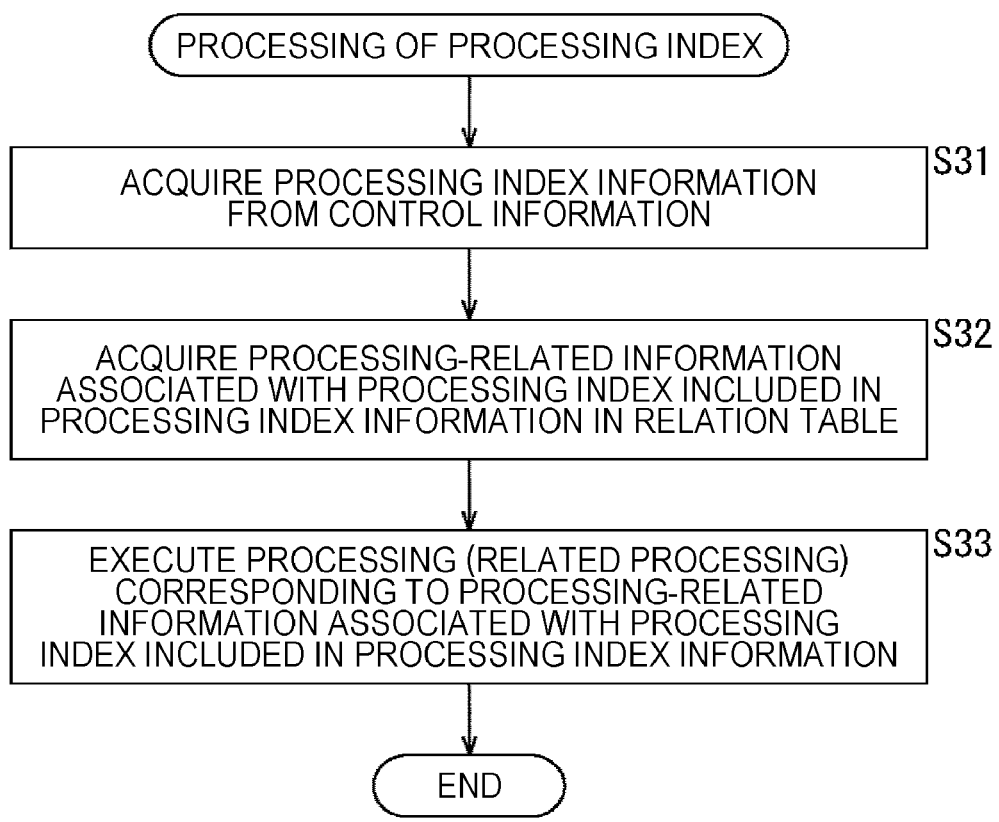
FIG. 7 is a flowchart for explaining an example of processing of a processing index performed by the receiving apparatus 12.

FIG. 7 is a flowchart illustrating an example of processing of index processing performed by the receiving apparatus 12 of FIG. 5.

In the processing of index processing, processing index information included in the control information which is the physical layer data of the transmission data is processed.

Specifically, in step S31, the processing index information acquiring unit 54 acquires the processing index information included in the control information from the control information acquiring unit 65, and supplies the processing index information to the processing execution unit 55. The processing then proceeds to step S32.

In step S32, the processing execution unit 55 acquires, as the information of interest, the processing-related information associated with the processing index included in the processing index information from the processing index information acquiring unit 54 in the relation table stored in the storage unit 53. The processing then proceeds to step S33.

In step S33, the processing execution unit 55 executes related processing corresponding to the processing-related information acquired as the information of interest.

In the receiving apparatus 12, the processing of processing index is repeatedly performed in the pipeline manner.

Note that, in the receiving apparatus 12, even when the power is turned off, the storage unit 53, the processing index information acquiring unit 54, and the processing execution unit 55 continue to operate similarly to FIG. 5. The processing of index processing of FIG. 7 is a processing performed by the storage unit 53, the processing index information acquiring unit 54, and the processing execution unit 55, and therefore the processing is also performed in the case where the power of the receiving apparatus 12 is turned off.

As described above, the transmitting apparatus 11 generates and transmits the transmission data that includes, in the physical layer data, the processing index information including the processing index associated with the predetermined processing-related information in the relation table provided as being included in the upper layer data.

On the other hand, the receiving apparatus 12 acquires the relation table provided as being included in the upper layer data, receives the transmission data including, in the physical layer data, the processing index information including the processing index associated with the predetermined processing-related information in the relation table, and acquires (the processing index included in) the processing index information included in the physical layer data of the transmission data. Then, the related processing corresponding to the processing-related information associated with the processing index, in the relation table, included in the processing index information included in the physical layer data is executed.

Therefore, it is possible to easily perform processing with high immediacy, flexibility, and even extensibility as related processing.

In other words, in the receiving apparatus 12, the physical layer data of the transmission data is processed first and processed even when the power of the receiving apparatus 12 is turned off, so the immediacy is excellent.

Usually, however, the amount of information transmitted as being included in physical layer data of transmission data is small. For example, the amount of information transmitted in the AC signal used for transmission of the seismic-motion alert information defined in Non-Patent Document 1 is 204 bits at the maximum. With such a small amount of information, it is difficult to perform processing with flexibility and extensibility as processing for outputting a seismic-motion alert.

On the other hand, according to the upper layer data of the transmission data, it is possible to transmit a large amount of information, and according to such a large amount of information, processing with high flexibility and extensibility can be easily performed.

That is, when transmitting the upper layer data including, for example, seismic-motion alert information, it is possible to easily change and extend the seismic-motion alert information. As a result, flexible and extensible processing can be performed as the processing for outputting the seismic-motion alert.

However, if the upper layer processing unit 52, which is provided as an SoC to process the upper layer data of the transmission data, is activated from the power-off state by, for example, an activation flag defined in the ISDB-T, the activation of the flag requires a certain period of time.

Further, in the upper layer processing unit 52, the DEMUX 71 performs filtering processing to separate various data from upper layer data. Therefore, when transmitting the upper layer data including the seismic-motion alert information, there is a delay due to the filtering processing to obtain the seismic-motion alert information from the upper layer data.

Therefore, it is difficult to guarantee immediacy when transmitting seismic-motion alert information in the upper layer data.

It should be noted that when transmitting the upper layer data including the seismic-motion alert information, it is possible to use part of (information for) signaling periodically arranged in the upper layer data as seismic-motion alert information. However, since the signaling period of the upper layer data is generally long, even when part of the signaling of the upper layer data is used as the seismic-motion alert information, it is still difficult to ensure immediacy.

On the other hand, in the transmission system shown in FIG. 1, the relation table in which the processing-related information related to the processing performed by the receiving apparatus 12 is registered in association with the processing index is provided as being included in the upper layer data. Thus, the receiving apparatus 12 acquires the relation table provided as being included in the upper layer data.

There is no strict limitation imposed on the information amount of the relation table provided as being included in the upper layer data. Therefore, it is possible to register the processing-related information related to various types of processing (related processing) in the relation table. Further, in the receiving apparatus 12, the relation table stored in the storage unit 53 is updated to the latest relation table. As a result, it is possible to easily perform processing with high flexibility and extensibility as the related processing corresponding to the processing-related information registered in the relation table.

In addition, the transmitting apparatus 11 generates and transmits the transmission data that includes the processing index information including the processing index in the physical layer data.

Then, the receiving apparatus 12 receives the transmission data from the transmitting apparatus 11, and acquires the processing index included in the processing index information included in the physical layer data of the transmission data. Further, the receiving apparatus 12 executes the related processing corresponding to the processing-related information associated with the processing index acquired from the physical layer data of the transmission data in the relation table that has been acquired in advance from the upper layer data and stored in the storage unit 53.

Since (the processing index information including) the processing index is included in the physical layer data of the transmission data, it is possible to decrease the amount of information of the processing index information included in the physical layer data by an amount corresponding to the relation table being included in and transmitted from the upper layer data. As a result, the receiving apparatus 12 can immediately acquire the processing index included in the physical layer data.

Therefore, the receiving apparatus 12 can immediately execute the related processing corresponding to the processing-related information associated with the processing index acquired from the physical layer data of the transmission data.

The relation table and the processing index (information) are described in detail below as an example of the related processing corresponding to the processing-related information when adopting the output processing for outputting an emergency alert and setting processing for setting tuning, for example.

<Example of Relation Table in which Processing-Related Information Related to Output Processing for Outputting Emergency Alert is Registered and Processing Index Information Including Processing Index Associated with Processing-Related Information>

FIG. 8 illustrates an example of syntax of processing index information including the processing index associated with the processing-related information related to output processing for outputting an emergency alert.

Hereinafter, the processing index information including a processing index associated with processing-related information related to output processing for outputting the emergency alert is also referred to as the processing index information for emergency alert.

In FIG. 8, the processing index information for emergency alert includes 1-bit EA_EXIST_FLAG. Further, the processing index information for the emergency alert includes 8-bit version and 8-bit NUM_EA_MESSAGE, as necessary.

In addition, the processing index information for the emergency alert includes a set of 8-bit EA_code, 2-bit EA_status, 3-bit location_type, location_length having a variable length, and location_code having a variable length, with the number of sets being represented by NUM_EA_MESSAGE.

EA_EXIST_FLAG is a flag indicating whether or not information after the EA_EXIST_FLAG exists in the processing index information for the emergency alert.

If EA_EXIST_FLAG indicates that information exists in the subsequent stage, the version, NUM_EA_MESSAGE is placed following EA_EXIST_FLAG.

The version represents the version of processing index information for the emergency alert. The version is incremented by 1 each time the processing index information for the emergency alert is updated, for example.

NUM_EA_MESSAGE represents the number of EA codes as the processing index to be placed subsequently.

After NUM_EA_MESSAGE, the set of EA_code, EA_status, location_type, location_length, and location_code is repeatedly placed for the number of times represented by NUM_EA_MESSAGE.

EA_code is the processing index associated with the emergency alert information representing the contents of an emergency alert as processing-related information related to the output processing for outputting the emergency alert. Hereinafter, EA_code is also referred to as a disaster type code EA_code.

EA_status represents the state of emergency alert.

The location_type represents the type of location_code.

The location_length represents the length (size) of location_code.

The location_code is a region code indicating a region to be subjected to the output processing corresponding to the emergency alert information as the processing-related information associated with EA_code as a processing index that forms a set with the location_code.

For the processing index information for the emergency alert, multiple types of location_code having different expression methods are prepared. The multiple types of location_code will be described later.

Hereinafter, the binary numbers are represented by numerical values postfixed with b.

FIG. 9 is a diagram for explaining EA_status in FIG. 8.

If EA_status is 0 (=00b), it indicates that the emergency alert has been started. If EA_status is 1 (=01b), it indicates that the emergency alert continues. If EA_status is 2 (=10b), it means that the emergency alert has ended. EA_status whose value is 3 (=11b) indicates a future reservation (reserved).

FIG. 10 is a diagram for explaining location_type in FIG. 8.

If location_type is 0 (=000b), it indicates that the object of the alert is nationwide. If the location_type is 0, location_length and location_code are not placed subsequently (or placed but ignored by the receiving apparatus 12).

If location_type is 1 (=001b), it indicates that the location_code expresses a region with a predetermined code that has been fixed in advance, that is, a region code of the prefecture, for example, defined in JIS X0401. The correspondence relationship between the prefecture region code and the prefecture represented by the prefecture region code can be preset, for example, in the receiving apparatus 12.

Note that the prefecture region code defined in JIS X0401 is represented by 8 bits. Therefore, if location_type is 1, the size of location_code is fixed to 8 bits.

As described above, if location_type is 1, the size of location_code uniquely becomes 8 bits and does not change. Therefore, in the processing index information for the emergency alert (FIG. 8), there is no need to place location_length indicating the size of location_code.

If location_type is 2 (=010b), location_code indicates that the region is expressed using postal code.

The postal code is a 7-digit decimal number. If the location_code expresses the region using the postal code, a value representing a decimal number which is a whole or part of the postal code expressed in a binary coded decimal (BCD) is set in location_code.

Here, according to BCD, each digit of a decimal number is represented by 4 bits.

In addition, when expressing a region using all seven digits of the postal code, the size of the location_code is maximized.

Therefore, the maximum size of location_code expressing the region using the postal code is 28 bits=7 digits×4 bits.

The maximum number of digits of the numerical value represented by location_code expressing the region using the postal code is seven digits of the postal code, and 3 bits which are the minimum number of bits that can express the digit number 7 is assigned to location_length. The location_length of 3 bits is set to a value representing the number of decimal digits as the whole or part of the postal code represented by location_code.

If location_type is 3 (=011b), it indicates that location_code represents a region using latitude and longitude.

In this case, the latitude and the longitude of two points, for example, are set in location_code, and location_code represents a rectangular region whose diagonal line runs between the two points.

As the latitude and the longitude, for example, a 9-digit decimal number including an integer part of 3 digits and a fraction part of 6 digits at the maximum can be adopted.

The location_code is set to a numeric value representing the decimal number as latitude and longitude in BCD.

Here, each of latitude and longitude is represented by a maximum of nine decimal digits as described above. Therefore, the maximum size of location_code in which the numerical value expressed in BCD is set is 144 bits=((9 digits×4 bits)+(9 digits×4 bits))×2 points.

In addition, 4 bits, which are the smallest number of bits that can represent 9, which is the maximum number of decimal digits as latitude and longitude respectively, is assigned to location_length. The location_length of 4 bits is set to a value representing the number of decimal digits as the latitude and longitude respectively set in location_code.

The location_type whose value is 4 (=100b) to 7 (=111b) is a future reservation (reserved).

FIG. 11 illustrates the correspondence relationship between the prefecture region codes defined in JIS X0401 and the prefectures represented by the prefecture region codes.

By presetting the correspondence relationship between the prefecture region code and the prefecture illustrated in FIG. 11 in the receiving apparatus 12, the receiving apparatus 12 can recognize the region (prefecture) represented by the prefecture region code.

Figure 12:
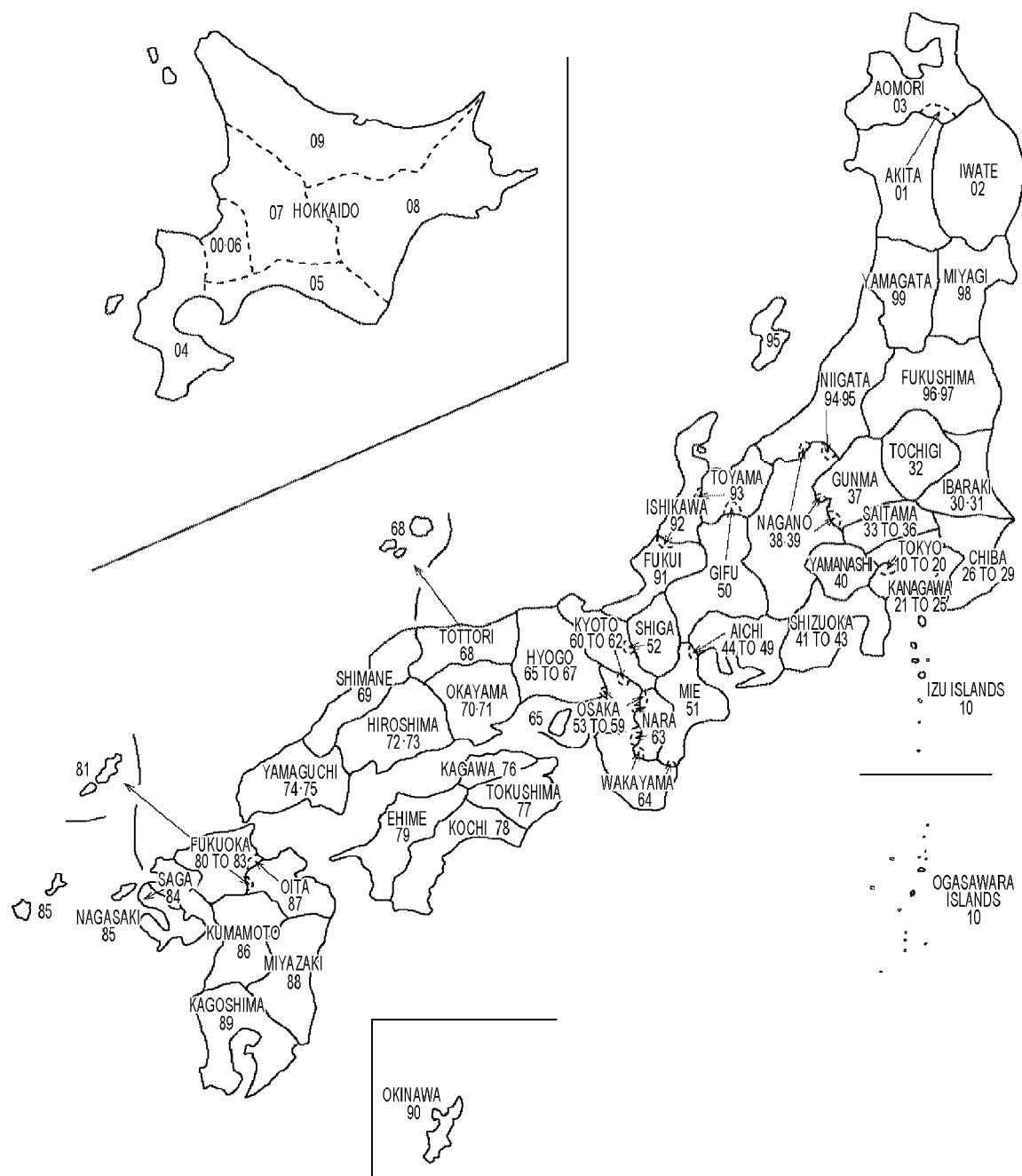
FIG. 12 is a view for explaining representation of regions using postal codes.

FIG. 12 is a diagram for explaining expressions of regions using postal codes.

7-digit postal codes are set for town areas and skyscrapers.

As illustrated in FIG. 12, the upper two digits of the seven-digit postal code (mostly) represent a prefecture. In addition, the upper three digits or five digits of the 7-digit postal code represent a post office under jurisdiction. Since the region under jurisdiction of the post office is fixed, the upper three digits or five digits of the postal code can be regarded as representing the region covered by the post office represented by those upper three digits or five digits.

If the upper three digits of the postal code represent the post offices under jurisdiction, the remaining four lower digits represent a town area number of the town area (or skyscraper). In addition, when the upper 5 digits of the postal code represent the post office under jurisdiction, the remaining two lower digits represent a town area number.

For example, for a 7-digit postal code, the 7-digit postal code, upper 2 digits, upper 3 digits, and upper 5 digits can be used in location_code.

Figure 13:
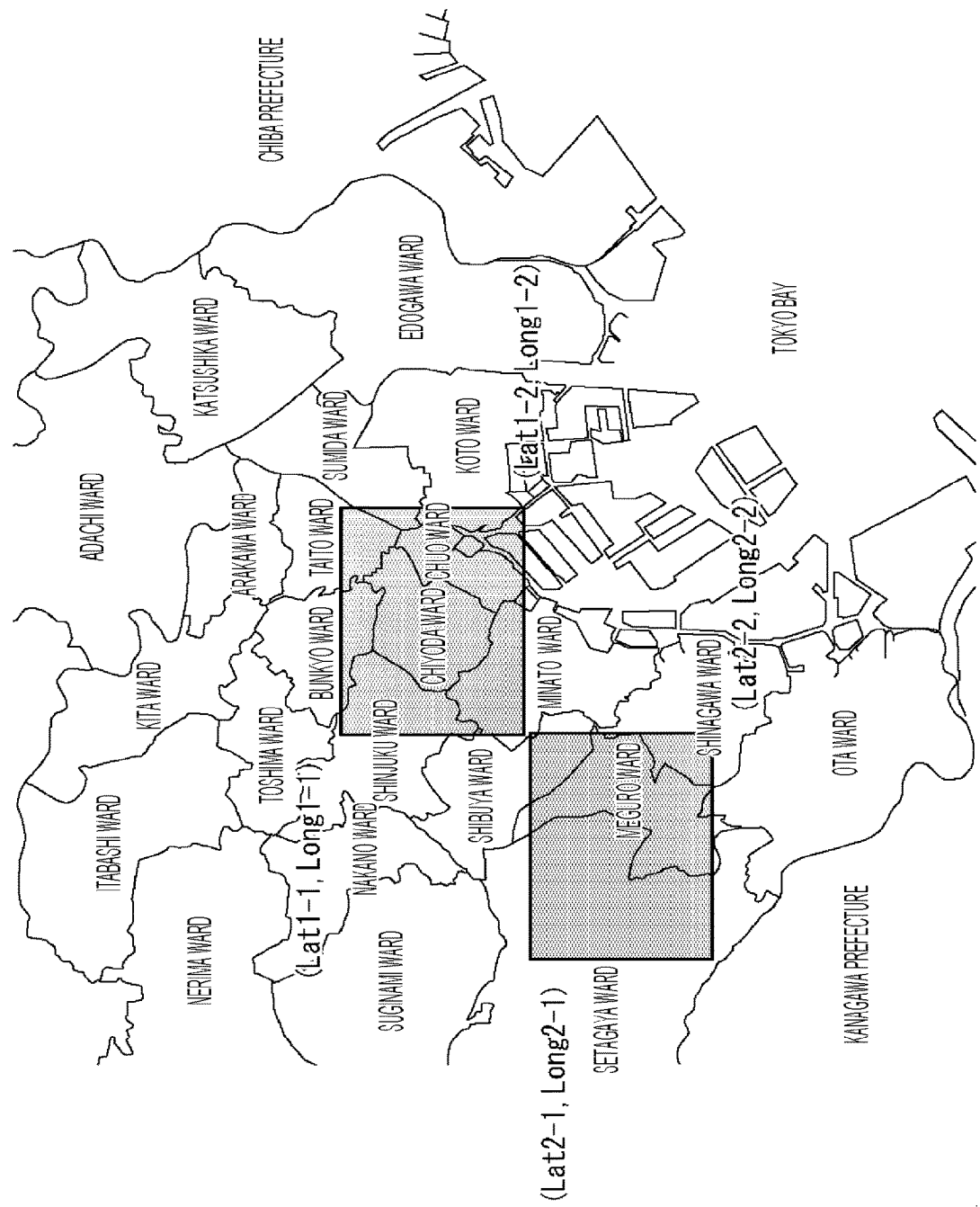
FIG. 13 is a diagram for explaining representation of regions using latitude and longitude.

FIG. 13 is a diagram for explaining representation of regions using the latitude and longitude.

To express regions using the latitude and longitude, the latitude and longitude at two points are set in location_code.

The location_code represents a rectangular region whose diagonal is the two points where latitude and longitude are set in the location_code.

As described above, as the region code, location_code, which is included in the processing index information for emergency alert, the prefecture region code, postal code, latitude and longitude, etc. defined in JIS X0401 corresponding to location_type can be used. Thus, relatively large regions, such as prefectures or provincial areas, relatively small regions, such as cities, towns, villages, or the like, and other regions of arbitrary size can be designated, as necessary.

FIG. 14 illustrates an example of syntax of the relation table in which the processing-related information related to output processing for outputting the emergency alert is registered.

That is, FIG. 14 illustrates an example of the syntax of the relation table used when the processing index information of FIG. 8 is used.

Hereinafter, the relation table in which the processing-related information related to the output processing for outputting the emergency alert is registered is also referred to as the emergency alert table.

In FIG. 14, the emergency alert table includes 8-bit table_id, 8-bit version, 8-bit length, and 8-bit NUM_EA_INFO.

Further, the emergency alert table includes a set of 8-bit EA_code, 16-bit EA_message_length, EA_message_data equivalent to 8×EA_message_length bits, with the number of sets being represented by NUM_EA_INFO.

The table_id represents an identification (ID) attached to the emergency alert table.

The version represents the version of the emergency alert table. The version is incremented by 1 each time the emergency alert table is updated, for example.

The length represents the size (length) of the emergency alert table.

NUM_EA_INFO represents the number of EA codes as the processing index to be placed subsequently.

After NUM_EA_INFO, the set of EA_code, EA_message_length, and the emergency alert information is repeatedly placed for the number of times represented by NUM_EA_INFO.

EA_message_length represents the length of the character string (the length of the emergency alert information) as the emergency alert information to be arranged subsequently.

EA_message_data represents characters constituting the emergency alert information. The sequence of characters represented by EA_message_data by the number represented by EA_message_length is the emergency alert information as the processing-related information related to the output processing for outputting the alert.

Hereinafter, the sequence of characters represented by EA_message_data by the number represented by EA_message_length is also referred to as emergency alert information EA_message_data.

In the emergency alert table of FIG. 14, the disaster type code EA_code as the processing index, EA_message_length, and the emergency alert information EA_message_data as the processing-related information are registered in the for loop of a variable i (for (i=0; i<NUM_EA_INFO; i++). That is, in the emergency alert table, the emergency alert information, EA_message_data, as the processing-related information is registered in association with the disaster type code EA_code as the processing index.

Here, assume that the set of the disaster type code EA_code, EA_message_length, and the emergency alert information EA_message_data placed in the for loop of the variable i are the disaster type information, NUM_EA_INFO represents the number of the disaster type information registered in the emergency alert table.

FIG. 15 illustrates an example of the emergency alert information EA_message_data as the processing-related information.

In FIG. 15, the emergency alert information EA_message_data is a message indicating various alerts.

Each emergency alert information EA_message_data is, for example, associated with the disaster type code EA_code having an individual value, as illustrated in FIG. 15.

In the transmission processing (FIG. 4) by the transmitting apparatus 11 of FIG. 2, the transmission data including, for example, the emergency alert table of FIG. 14 in the upper layer data and the process index information for the emergency alert illustrated in FIG. 8 in the physical layer data is transmitted.

In this case, in the reception processing (FIG. 6) by the receiving apparatus 12 of FIG. 5, when the receiving apparatus 12 is turned on, the DEMUX 71 acquires the emergency alert table included in the upper layer data of the transmission data and stores the emergency alert table in the storage unit 53.

Further, the receiving apparatus 12 of FIG. 5 performs the processing of the processing index regardless of the state of the power supply.

Figure 16:
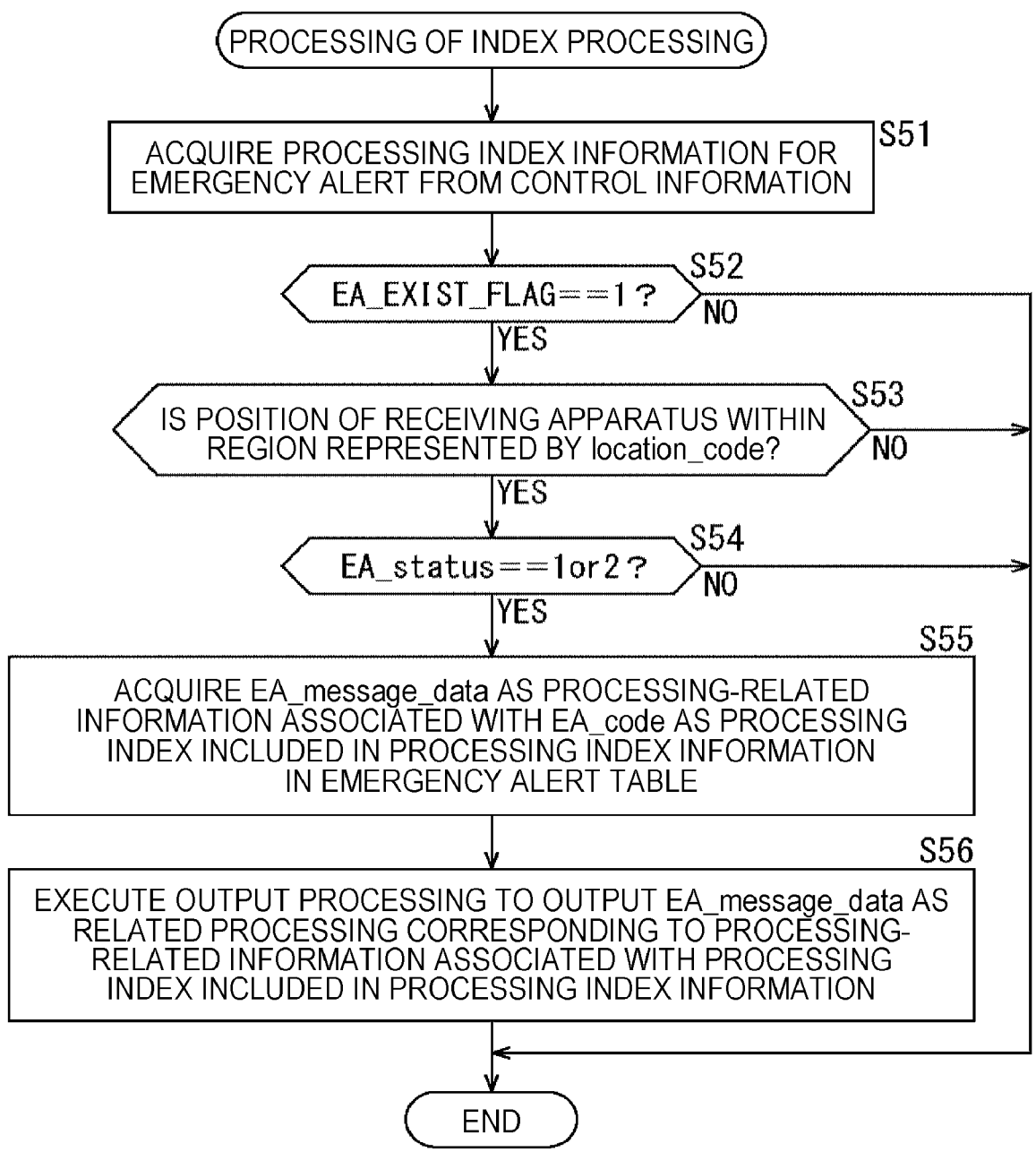
FIG. 16 is a flowchart for explaining an example of processing of a processing index performed on an emergency alert table and processing index information for emergency alert.

FIG. 16 is a flowchart for explaining an example of the processing of the processing index performed on the emergency alert table and the processing index information for the emergency alert.

That is, the flowchart of FIG. 16 illustrates an example of the processing of the processing index performed by the receiving apparatus 12 on the emergency alert table of FIG. 14 and the processing index information for the emergency alert of FIG. 8.

In the processing of the processing index, in step S51, the processing index information acquiring unit 54 of the receiving apparatus 12 (FIG. 5) acquires the processing index information for the emergency alert included in the control information from the control information acquiring unit 65, and supplies the processing index information to the processing execution unit 55, and the processing proceeds to step S52. Here, step S51 corresponds to step S31 in FIG. 7.

In step S52, the processing execution unit 55 of the receiving apparatus 12 (FIG. 5) acquires EA_EXIST_FLAG included in the processing index information for the emergency alert (FIG. 8) from the processing index information acquiring unit 54. Further, in step S52, the processing execution unit 55 determines whether EA_EXIST_FLAG acquired from the process index information is 1 that represents whether or not the information exists in the subsequent stage of the EA_EXIST_FLAG.

If it is determined in step S52 that EA_EXIST_FLAG is not 1, that is, if EA_EXIST_FLAG is 0 and the information does not exist in the subsequent stage, the processing of the processing index ends.

In addition, if it is determined in step S52 that EA_EXIST_FLAG is 1, that is, the information exists in the subsequent stage, the processing proceeds to step S53.

In step S53, the processing execution unit 55 acquires all of location_code included in the processing index information for the emergency alert (FIG. 8) from the processing index information acquiring unit 54. Further, in step S53, the processing execution unit 55 determines whether the position of the receiving apparatus, which is the current location of the receiving apparatus 12, is included in the region represented by any one of location_code included in the processing index information for the emergency alert.

Here, the processing execution unit 55 recognizes the position of the receiving apparatus by any method. As a method of recognizing the position of the receiving apparatus, the user is asked to enter information, for example, which is necessary for recognizing the position of the receiving apparatus, such as the postal code of the region including the position of the receiving apparatus, in initial setting of the receiving apparatus 12. From the information, the position of the receiving apparatus is recognized. Further, as another method of recognizing the position of the receiving apparatus, the receiving apparatus 12 includes, for example, a global navigation satellite system (GNSS) to recognize the position of the receiving apparatus using the GNSS.

Note that the processing execution unit 55 recognizes the region represented by location_code included in the processing index information for the emergency alert (FIG. 8) using, as necessary, location_type and location_length which are provided as a set with location_code.

If it is determined in step S53 that the position of the receiving apparatus is not included in any region represented by location_code, that is, if the position of the receiving apparatus is not included in the target region of the emergency alert, the processing of the processing index ends.

In addition, if it is determined in step S53 that the position of the receiving apparatus is included in the region represented by location_code, that is, if the position of the receiving apparatus is included in the target region of the emergency alert, the processing execution unit 55 specifies (stores) location_code representing the region of the position of the receiving apparatus as a region code of interest, location_code. The processing then proceeds to step S54.

In step S54, the processing execution unit 55 acquires EA_status that is provided as a set with the region code of interest, location_code, from the processing index information (FIG. 8). Further, in step S54, the processing execution unit 55 determines whether EA_status (FIG. 9) provided as a set with the region code of interest, location_code, is 1 or 2 representing the start or continuation of the emergency alert.

If it is determined in step S54 that EA_status is neither 1 nor 2, that is, if the emergency alert has ended, the processing of the processing index ends.

In addition, if it is determined in step S54 that EA_status is either 1 or 2, that is, if the emergency alert has been started or is continuing, the processing proceeds to step S55.

In step S55, the processing execution unit 55 acquires the disaster type code EA_code as the processing index which is provided as a set with the region code of interest, location_code, from the processing index information (FIG. 8) as the disaster type code of interest, EA_code.

Further, in step S55, the processing execution unit 55 acquires, as the information of interest, the emergency alert information, EA_message_data, as the processing-related information associated with (the disaster type code EA_code that coincides with) another disaster type code of interest, EA_code, as the processing index in the emergency alert table (FIG. 14) stored in the storage unit 53 by the reception processing. Here, step S55 corresponds to step S32 in FIG. 7.

Thereafter, the processing proceeds from step S55 to step S56, and the processing execution unit 55 executes output processing for outputting the emergency alert information, EA_message_data, as the information of interest, as the related processing corresponding to the processing-related information acquired as the information of interest. The processing of the processing index then ends.

In one example of the output processing for outputting the emergency alert information, EA_message_data, as the information of interest, message display processing for displaying the emergency alert information, EA_message_data, as the information of interest on the output apparatus 13, or voice message output processing for allowing voice output by the output apparatus 13 is performed.

Here, step S56 corresponds to step S33 in FIG. 7.

FIG. 17 illustrates another example of the syntax of the processing index information for the emergency alert.

The processing index information for the emergency alert of FIG. 17 includes EA_EXIST_FLAG, version, NUM_EA_MESSAGE, EA_code, and EA_status.

Therefore, the processing index information for the emergency alert of FIG. 17 is similar to the case of FIG. 8 in including EA_EXIST_FLAG, version, NUM_EA_MESSAGE, EA_code, and EA_status.

However, the processing index information for the emergency alert in FIG. 17 differs from the case of FIG. 8 including the set of location_type, location_length, and location_code in that the region information representing the region to be subjected to the output processing are not included, that is, the set of location_type, location_length, and location_code is not included.

FIG. 18 illustrates another example of the syntax of the emergency alert table as the relation table.

That is, FIG. 18 illustrates an example of the syntax of the emergency alert table used when the processing index information of FIG. 17 is used.

The emergency alert table of FIG. 18 includes table_id, version, length, NUM_EA_INFO, EA_code, location_type, location_length, location_code, EA_message_length, and EA_message_data.

Therefore, the emergency alert table of FIG. 18 is common to the case of FIG. 14 in that table_id, version, length, NUM_EA_INFO, EA_message_length, and EA_message_data are included.

However, the emergency alert table of FIG. 18 differs from the case of FIG. 14 not including the set of location_type, location_length, and location_code in that the region information representing the region to be subjected to the output processing are newly included, that is, the set of location_type, location_length, and location_code is newly included That is, in the emergency alert table of FIG. 18, the emergency alert information, EA_message_data, as the processing-related information and the region information including the region code, location_code, indicating the region to be subjected to the output processing corresponding to the emergency alert information, EA_message_data, are registered in association with the disaster type code, EA_code, as the processing index.

If the processing index information for the emergency alert of FIG. 17 and the emergency alert table of FIG. 18 are used, in the transmission processing (FIG. 4) by the transmitting apparatus 11 in FIG. 2, the transmission data including, for example, the emergency alert table of FIG. 18 in the upper layer data and the processing index information for the emergency alert of FIG. 17 in the physical layer data is transmitted.

In this case, in the reception processing (FIG. 6) by the receiving apparatus 12 of FIG. 5, when the receiving apparatus 12 is turned on, the DEMUX 71 acquires the emergency alert table included in the upper layer data of the transmission data and stores the emergency alert table in the storage unit 53.

Further, the receiving apparatus 12 of FIG. 5 performs the processing of the processing index regardless of the state of the power supply.

Figure 19:
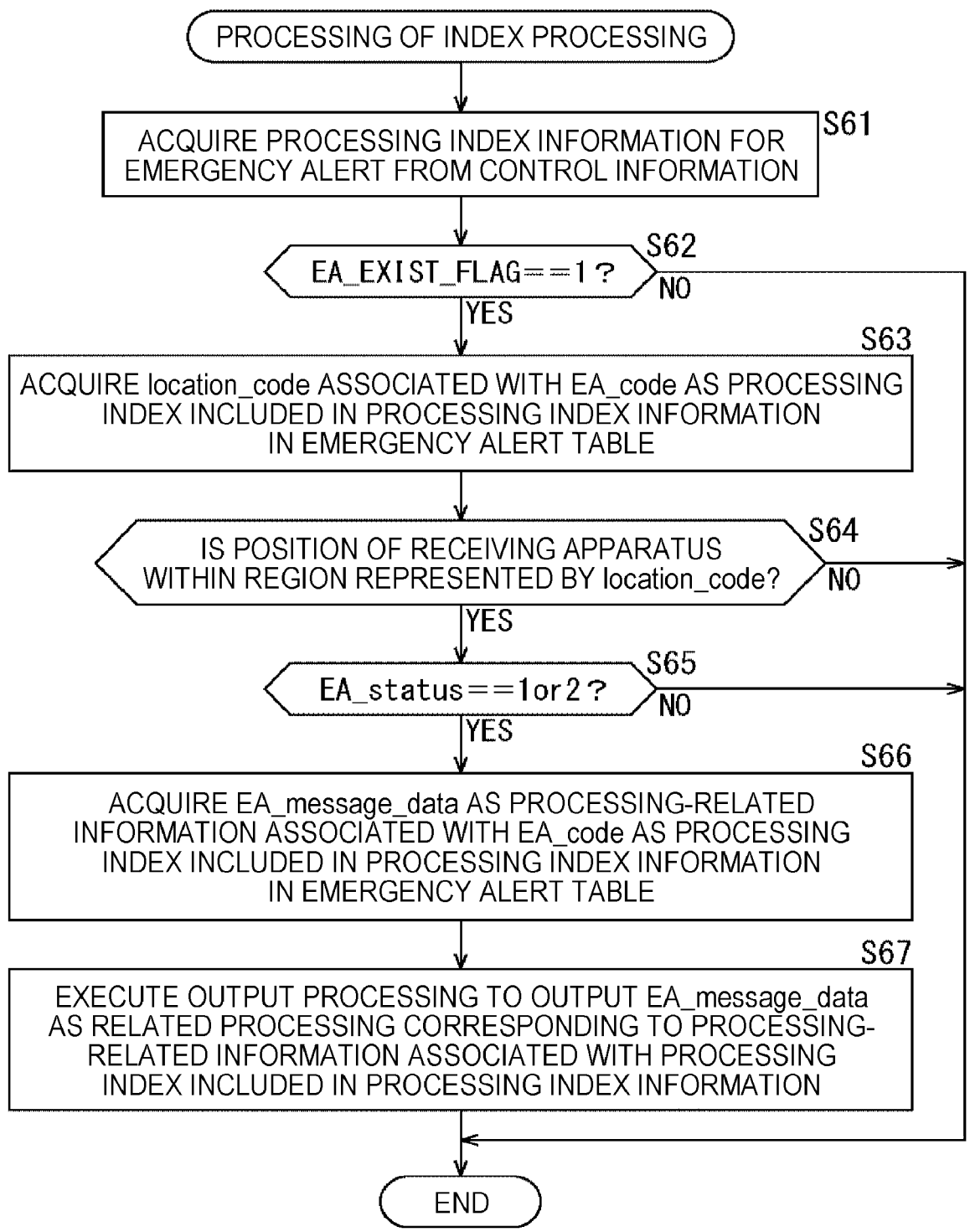
FIG. 19 is a flowchart for explaining another example of processing of processing index performed on the emergency alert table and the processing index information for emergency alert.

FIG. 19 is a flowchart for explaining another example of processing of processing index performed on the emergency alert table and the processing index information for emergency alert.

That is, the flowchart of FIG. 19 illustrates an example of processing of the processing index performed by the receiving apparatus 12 on the emergency alert table of FIG. 18 and the processing index information for the emergency alert of FIG. 17.

In the processing of the processing index, in step S61, the processing index information acquiring unit 54 of the receiving apparatus 12 (FIG. 5) acquires the processing index information for the emergency alert included in the control information from the control information acquiring unit 65, similarly to step S51 of FIG. 16, and supplies the processing index information to the processing execution unit 55. The processing then proceeds to step S62. Here, step S61 corresponds to step S31 in FIG. 7.

In step S62, the processing execution unit 55 of the receiving apparatus 12 (FIG. 5) acquires EA_EXIST_FLAG included in the processing index information for the emergency alert (FIG. 17) from the processing index information acquiring unit 54. Further, in step S62, the processing execution unit 55 determines, similarly to step S52 of FIG. 16, whether EA_EXIST_FLAG acquired from the process index information is 1 that indicates if the information exists in the subsequent stage of EA_EXIST_FLAG.

If it is determined in step S62 that EA_EXIST_FLAG is not 1, that is, if EA_EXIST_FLAG is 0, and no information exists in the subsequent stage, the processing of the processing index ends.

In addition, if it is determined in step S62 that EA_EXIST_FLAG is 1, that is, if the information exists in the subsequent stage, the processing proceeds to step S63.

In step S63, the processing execution unit 55 acquires all disaster type codes, EA_code, included in the processing index information for the emergency alert (FIG. 17) from the processing index information acquiring unit 54. Further, in step S63, the processing execution unit 55 acquires, in the emergency alert table (FIG. 18), all of location_code (hereinafter also referred to as registered region code, location_code) associated with (EA_code that coincides with) the disaster type code, EA_code, acquired from the processing index information for the emergency alert. The processing then proceeds to step S64.

In step S64, the processing execution unit 55 determines whether the position of the receiving apparatus 12 is included in the region represented by any one of the registered region codes, location_code, acquired in step S63.

If it is determined in step S64 that the position of the receiving apparatus is not included in any region represented by the registered region codes, location_code, that is, if the position of the receiving apparatus is not included in the target region of the emergency alert, the processing of the processing index ends.

In addition, if it is determined in step S64 that the position of the receiving apparatus is included in the region represented by any one of the registered region codes, location_code, that is, if the position of the receiving apparatus is included in the target region of the emergency alert, the processing execution unit 55 specifies (stores) the disaster type code, EA_code, associated with the registered region code, location_code, representing the region including the position of the receiving apparatus in the emergency alert table (FIG. 18), as the disaster type code of interest, EA_code. The processing then proceeds to step S65.

In step S65, the processing execution unit 55 acquires EA_status which is provided as a set with the disaster type code of interest, EA_code, from the processing index information (FIG. 17). Further, in step S65, the processing execution unit 55 determines whether the EA_status (FIG. 9) which is provided as a set with the disaster type code of interest, EA_code, is 1 or 2 representing the start or continuation of the emergency alert.

If it is determined in step S65 that EA_status is neither 1 nor 2, that is, the emergency alert has ended, the processing of the processing index ends.

In addition, if it is determined in step S65 that EA_status is either 1 or 2, that is, if the emergency alert has been started or is continuing, the processing proceeds to step S66.

In step S66, the processing execution unit 55 acquires the emergency alert information, EA_message_data, as the processing-related information associated with (the disaster type code, EA_code, which coincides with) the disaster type code of interest, EA_code, as the processing index as the information of interest in the emergency alert table (FIG. 18) stored in the storage unit 53 by the receiving process. Here, step S66 corresponds to step S32 in FIG. 7.

Thereafter, the processing proceeds from step S66 to step S67, and the processing execution unit 55 executes, similarly to step S56 of FIG. 16, the output processing for outputting the emergency alert information, EA_message_data, as the information of interest, as the related processing corresponding to the processing-related information acquired as the information of interest. The processing of the processing index then ends. Here, step S67 corresponds to step S33 in FIG. 7.

As described above, the emergency alert system using the emergency alert table and the processing index information for the emergency alert, that is, the emergency alert system performing the emergency alerting includes the transmitting apparatus 11 that transmits the transmission data including the emergency alert table in the upper layer data and the processing index information for the emergency alert in the physical layer data, and the receiving apparatus 12 that acquires the emergency alert table included in the upper layer data of the transmission data, and executes the output processing for outputting the emergency alert information, EA_message_data, which is associated with the processing index included in the physical layer data of the transmission data. In such an emergency alert system, the emergency alert table in which the emergency alert information, EA_message_data, which is associated with the disaster type code, EA_code, as the processing index is registered is included in the upper layer data and provided. Thus, the flexibility and extensibility of the emergency alert can be improved, while the immediacy can be improved as the disaster type code, EA_code, as the processing index is included in the physical layer data and provided.

It should be noted that the emergency alert method using the emergency alert table and the processing index information for emergency alert can be applied to, for example, ISDB-T, Digital Video Broadcasting (DVB), Advanced Television Systems Committee (ATSC), or any other broadcasting method.

For example, in ATSC 3.0, the emergency alert signaling is defined in Annex G.

Figure 20:
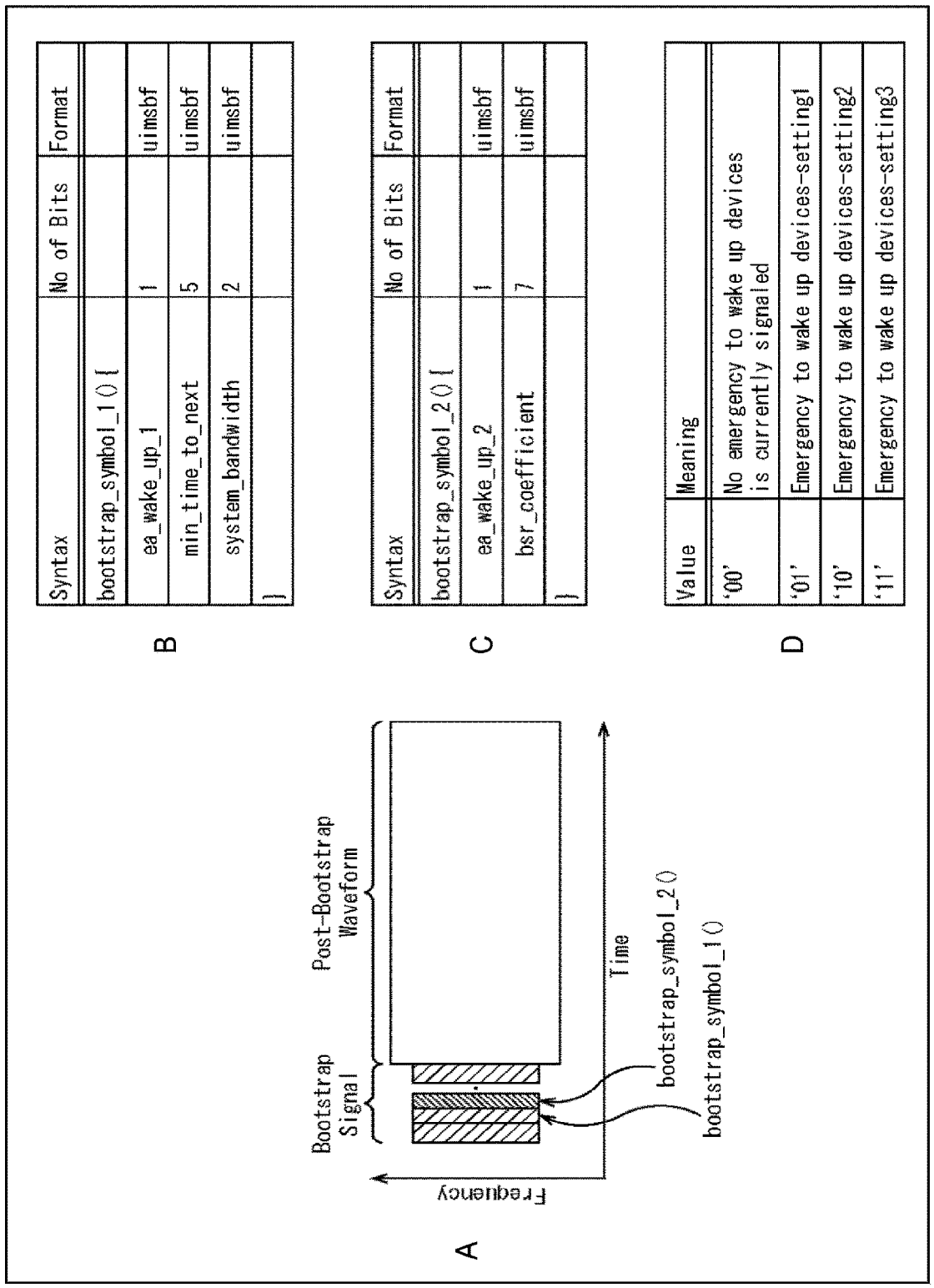
FIG. 20 is a diagram for explaining emergency alert signaling defined in ATSC3.0.

FIG. 20 is a diagram for explaining emergency alert signaling defined in ATSC 3.0.

A of FIG. 20 represents a structure of a general physical layer frame and a boot strap (ATSC 3.0).

A of FIG. 20 illustrates a bootstrap signal including a plurality of bootstrap symbols and BootStrap_symbol_1( ) and BootStrap_symbol_2( ) are defined in the plurality of boot slap symbols.

B of FIG. 20 illustrates the syntax of BootStrap_symbol_1( ), and C of FIG. 20 illustrates the syntax of BootStrap_symbol_2( ).

BootStrap_symbol_1( ) includes 1-bit ea_wake_up_1, and BootStrap_symbol_2( ) includes 1-bit ea_wake_up_2.

2 bits of ea_wake_up_1 and ea_wake_up_2 are defined in Annex G of A/331 as wake-up bits.

D of FIG. 20 illustrates the definition of the wake-up bits.

According to D of FIG. 20, the activation of the receiving apparatuses (devices) is defined in association with the wake-up bits at settings 1, 2, and 3 as processing in an emergency.

For emergency alert signaling of ATSC 3.0 as described above, an emergency alert system using the emergency alert table and the processing index information for the emergency alert can be used.

That is, for example, by providing the emergency alert table in which the wakeup bit is used as the processing index and the wakeup bit used as the processing index is registered in association with the processing-related information as being included in the upper layer data, the processing of high immediacy and high flexibility can be performed in the ATSC as the output processing for outputting the emergency alert.

<Example of Relation Table in which Processing-Related Information Related to Setting Processing for Setting Tuning and Processing Index Information Including Processing Index Associated with Processing-Related Information>

FIG. 21 illustrates an example of syntax of the processing index information including the processing index associated with the processing-related information related to the setting processing for setting the tuning.

Hereinafter, the processing index information including the processing index associated with the processing-related information related to the setting processing for setting the tuning is also referred to as processing index information for tuning setting.

In FIG. 21, the processing index information for tuning setting includes 1-bit location_exist_flag. Further, the processing index information for tuning setting includes 8-bit location_code, as necessary.

The location_exist_flag is a flag indicating whether information exists in the subsequent stage of location_exist_flag in the processing index information for tuning setting.

If location_exist_flag indicates that the information exists in the subsequent stage, location_code is placed after location_exist_flag.

The location_code is, for example, a region code representing a region, as in the case of the processing index information for the emergency alert in FIG. 8. However, in the processing index information for tuning setting, the region code, location_code, is the processing index that is associated with tuning information necessary (useful) for setting the tuning as the processing-related information related to the setting processing for setting the tuning.

It should be noted that, in the processing index information for tuning setting, the region code, location_code, is fixed to a predetermined type of code, that is, the prefecture region code, for example, defined in JIS X0401 as described in connection with FIG. 12. Therefore, location_type and location_length are not placed (not needed) in the processing index information for tuning setting, unlike the processing index information for the emergency alert.

A value indicating a region in the reception area that can receive the transmission data transmitted by the transmitting apparatus 11 is set in the region code, location_code, as the processing index included in the processing index information for tuning setting.

FIG. 22 illustrates an example of syntax of the relation table in which tuning information as the processing-related information related to the setting process for setting the tuning is registered.

That is, FIG. 22 illustrates an example of the syntax of the relation table used in the case of using the processing index information of FIG. 21.

Hereinafter, the relation table in which the processing-related information related to the setting processing for setting the tuning is registered is also referred to as a tuning information table.

In FIG. 22, the tuning information table includes 8-bit table_id, 8-bit length, and 8-bit NUM_TUNE_INFO.

Further, the tuning information table includes a set of 8-bit region code, location_code, 6-bit channel, 3-bit protocol, 3-bit packet_type, 2-bit layer_fft_size, 3-bit layer_mod, 3-bit layer_cod, 3-bit layer_gi, 8-bit message_length, 8×message_length bits of message_data, with the number of sets being represented by NUM_TUNE_INFO.

In FIG. 22, channel, protocol, packet_type, layer_fft_size, layer_mod, layer_cod, layer_gi, and message_data are tuning information.

The table_id represents an identification (ID) attached to the tuning information table.

The length represents the size (length) of the tuning information table.

NUM_TUNE_INFO represents the number of region codes, location_code, as the processing index to be placed subsequently.

Here, in the tuning information table, tuning information (channel, protocol, packet_type, layer_fft_size, layer_mod, layer_cod, layer_gi, message_data) as the processing-related information is associated with the region code, location_code, which is the processing index, and registered. Therefore, NUM_TUNE_INFO represents the number of region codes, location_code, registered in the tuning information table, and also represents the number of pieces of the tuning information registered in the tuning information table.

After NUM_TUNE_INFO, the set of region code, location_code, the tuning information, and message_length is repeatedly placed for the number of times represented by NUM_TUNE_INFO.

The channel in the tuning information represents the frequency and channel number of the receivable channel in the region indicated by the region code, location_code, which is set with the channel. Here, for example, in the ISDB-T, 40 channels with channel numbers from 13 to 52 are provided in the UHF band, and the (center) frequency of each channel and the channel number uniquely correspond to each other. Therefore, in the ISDB-T, the frequency of the channel and the channel number are equivalent information.

The protocol in the tuning information represents the protocol (broadcasting system) of the transmission data transmitted on the channel (channel number) indicated by channel which is set with the protocol.

The packet_type in the tuning information represents the packet_type of the packet constituting the upper layer data of the transmission data transmitted on the channel indicated by channel which is set with the packet_type.

Layer_fft_size in the tuning information represents the FFT size when FFT is performed on the OFDM signal as the transmission data transmitted on the channel indicated by channel which is set with that layer_fft_size.

The layer_mod in the tuning information represents the modulation of the subcarrier of the OFDM signal as the transmission data transmitted on the channel indicated by channel which is set with the layer_mod.

The layer_cod in the tuning information is a code rate of an error correction code (FEC) used for error correction coding performed in coding the transmission channel when generating the transmission data to be transmitted on the channel indicated by channel which is set with the layer_cod.

Layer_gi in the tuning information represents the length (GI length) of GI added to the OFDM signal as transmission data transmitted on the channel indicated by channel which is set with the layer_gi.

The message_data in the tuning information represents characters constituting a message (hereinafter also referred to as a channel message) on the channel indicated by channel which is set with the message_data. In the tuning information, a sequence of characters indicated by message_data for the number indicated by message_length is the channel message of the channel indicated by channel included in the tuning information.

Hereinafter, the sequence of characters indicated by message_data for the number indicated by message_length is also referred to as the channel message, message_data.

The message_length represents the length of the character string (the length of the channel message) as message_data to be placed subsequently.

In the tuning information table of FIG. 22, the region code, location_code, as the processing index, message_length, and the tuning information as the processing-related information (channel, protocol, packet_type, layer_fft_size, layer_mod, layer_cod, layer_gi, message_data) are registered in the for loop of the variable i (for (i=0; i<NUM_TUNE_INFO; i++)). That is, in the tuning information table, the tuning information as the processing-related information is registered in association with the region code, location_code, as the processing index.

FIG. 23 illustrates an example of relationship between the channel number and the (center) frequency of the channel.

Now, with respect to the channel, it is assumed that the channel number and the frequency are associated, for example, as illustrated in FIG. 23. In a case where the channel number and the frequency are associated with each other, the channel number or the frequency can be set as the channel specifying information in channel as the tuning information in the tuning information table (FIG. 22).

FIG. 24 is a diagram for explaining an example of protocol as the tuning information in the tuning information table (FIG. 22).

In FIG. 24, if protocol is 0 (=000b), it indicates that the broadcasting system of the transmission data is the ISDB-T system. If protocol is 1 (=001b), it indicates that the broadcasting system of the transmission data is the next generation system of ISDB-T system (ISDB-T2 system in FIG. 24).

The value of protocol being 2 (=010b) to 7 (=111b) indicates a future reservation (reserved).

FIG. 25 is a diagram for explaining an example of packet_type as tuning information in the tuning information table (FIG. 22).

In FIG. 25, if packet_type is 0 (=000b), it indicates that the upper layer data of the transmission data is MPEG2-TS. If packet_type is 1 (=001b), it indicates that the upper layer data of the transmission data is TLV/MMV.

The value of packet_type being 2 (=010b) to 7 (=111b) indicates a future reservation (reserved).

FIG. 26 is a diagram for explaining an example of layer_fft_size as the tuning information in the tuning information table (FIG. 22).

In FIG. 26, if layer_fft_size is 0 (=00b) to 2 (=10b), it indicates that the FFT size is 8K, 16K, or 32K, respectively. It should be noted that 1K means 1024 points.

The value of layer_fft_size being 3 (=11b) indicates a future reservation (reserved).

FIG. 27 is a diagram for explaining an example of layer_mod as the tuning information in the tuning information table (FIG. 22).

In FIG. 27, if the layer_mod is 0 (=000b) to 5 (101b), it means that the modulation is QPSK, 16 QAM, 64 QAM, 256 QAM-NUC (Non Uniform Constellation), 1024 QAM-NUC, or 4096 QAM-NUC, respectively.

The value of layer_mod being 6 (=110b) and 7 (=111b) is a future reservation (reserved).

FIG. 28 is a diagram for explaining an example of layer_cod as the tuning information in the tuning information table (FIG. 22).

In FIG. 28, if the value of layer_cod being 0 (=000b) to 4 (=100b), it means that the code rate is ½, ⅔, ¾, ⅚, or ⅞, respectively.

The value of layer_cod being 5 (=101b) to 7 (=111b) indicates a future reservation (reserved).

FIG. 29 is a diagram for explaining an example of layer_gi as the tuning information in the tuning information table (FIG. 22).

In FIG. 29, if layer_gi is 0 (=000b) to 3 (=011b), it means that the GI length is ¼, ⅛, 1/16, or 1/32, respectively, of the symbol length (effective symbol length) of the OFDM symbols.

The value of layer_gi being 4 (=100b) to (=111b) indicates a future reservation (reserved).

FIG. 30 illustrates an example of the region code, location_code, as the processing index registered in the tuning information table and the tuning information (channel, protocol, packet_type, layer_fft_size, layer_mod, layer_cod, layer_gi, message_data) associated with the region code, location_code.

In FIG. 30, as the tuning information (channel, protocol, packet_type, layer_fft_size, layer_mod, layer_cod, layer_gi, message_data) for selecting a receivable channel in the region represented by, for example, the region code, location_code=0, as the processing index, the tuning information of four channels (13,0,0,0,2,2,2, "Channel 1"), (14,0,0,0,0, 0, 1, "Channel 2"), (15,1,1,2,3,3,2, "Channel 3"), and (16, 1,1,2,3,4,3, "Channel 4") are associated with the region code, location_code=0.

For example, in the transmission processing (FIG. 4) by the transmitting apparatus 11 of FIG. 2, the transmission data including the tuning information table of FIG. 22 in the upper layer data, and the processing index information for tuning setting of FIG. 21 in the physical layer data is transmitted.

In this case, when the power supply of the receiving apparatus 12 is turned on, the DEMUX 71 acquires the tuning information table included in the upper layer data of the transmission data and stores the tuning information table in the storage unit 53 in the reception processing (FIG. 6) by the receiving apparatus 12 of FIG. 5.

Further, the receiving apparatus 12 of FIG. 5 performs the processing of the processing index regardless of the state of the power supply.

Figure 31:
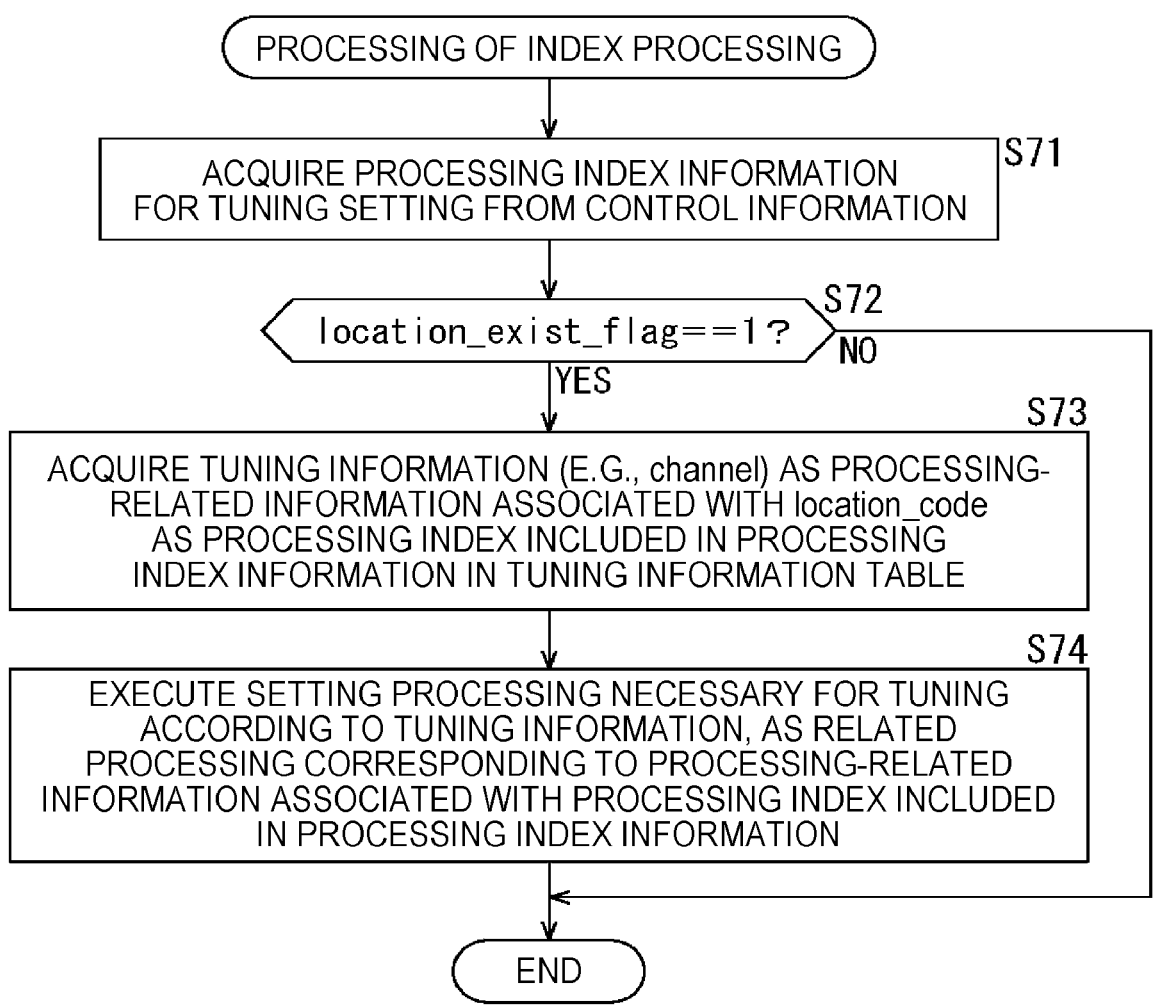
FIG. 31 is a flowchart for explaining an example of processing of processing index performed on the tuning information table and processing index information for setting tuning.

FIG. 31 is a flowchart for explaining an example of processing of the processing index performed on the tuning information table and the processing index information for tuning setting.

That is, the flowchart of FIG. 31 illustrates an example of the processing of the processing index performed by the receiving apparatus 12 on the tuning information table of FIG. 22 and the processing index information for tuning setting of FIG. 21.

In the processing of the processing index, in step S71, the processing index information acquiring unit 54 of the receiving apparatus 12 (FIG. 5) acquires the processing index information for tuning setting included in the control information from the control information acquiring unit 65, and supplies the processing index information to the processing execution unit 55. The processing then proceeds to step S72. Here, step S71 corresponds to step S31 in FIG. 7.

In step S72, the processing execution unit 55 of the receiving apparatus 12 (FIG. 5) acquires location_exist_flag included in the processing index information (FIG. 21) for tuning setting from the processing index information acquiring unit 54. Further, in step S72, the processing execution unit 55 determines whether location_exist_flag acquired from the process index information has a value 1 that indicates whether the information exists in the subsequent stage of location_exist_flag.

If it is determined in step S72 that the location_exist_flag is not 1, that is, location_exist_flag is 0 and no information exists in the subsequent stage, the processing of the processing index ends.

In addition, if it is determined in step S72 that the location_exist_flag is 1, that is, the region code, location_code, as the processing index of the information in the subsequent stage, exists, the processing proceeds to step S73.

In step S73, the processing execution unit 55 acquires all of the region code, location_code, as the processing index included in the processing index information as the region code of interest, location_code.

Further, in step S73, the processing execution unit 55 acquires, as the information of interest, all of the tuning information (channel, protocol, packet_type, layer_fft_size, layer_mod, layer_cod, layer_gi, message_data) as the processing-related information associated with (the region code, location_code, which coincident with) the region code of interest, location_code, as the processing index in the tuning information table (FIG. 22) stored in the storage unit 53 by the reception processing. Here, step S73 corresponds to step S32 in FIG. 7.

Thereafter, the processing proceeds from step S73 to step S74, and the processing execution unit 55 executes setting processing for setting tuning in accordance with the tuning information (channel, protocol, packet_type, layer_fft_size, layer_mod, layer_cod, layer_gi, message_data) which is the information of interest, as the related processing in accordance with the processing-related information acquired as the information of interest. The processing of the processing index then ends. Here, step S74 corresponds to step S33 in FIG. 7.

As described above, the tuning setting system using the tuning information table and the processing index information for the tuning setting, that is, the tuning setting system performing the tuning setting includes the transmitting apparatus 11 that transmits the transmission data including the tuning information table in the upper layer data and the processing index information for the tuning setting in the physical layer data, and the receiving apparatus 12 that acquires the tuning information table included in the upper layer data of the transmission data, and executes the setting processing according to the tuning information associated with the processing index included in the physical layer data of the transmission data. In such a tuning setting system, the receiving apparatus 12 acquires the tuning information table provided as being included the upper layer data and, subsequently, receives the region code, location_code, as the processing index provided as being included in the physical layer data. Thus, the tuning setting processing is performed on the receivable channels at the position of the receiving apparatus 12, thus facilitating the tuning setting.

Further, when the receiving apparatus 12 moves, the tuning setting processing is performed for the receivable channels at the position of the movement destination of the receiving apparatus 12. This prevents interruption of program viewing for an extended period of time due to scanning of the receivable channels at the movement destination of the receiving apparatus 12.

In addition, if, for example, the transmission parameter of broadcasting is updated (changed) on the receivable channel at the position of the receiving apparatus 12, the receiving apparatus 12 acquires the tuning information table reflecting the updated transmission parameter to easily cope with the updating of the transmission parameters.

Note that, in the present embodiment, an OFDM signal is adopted as the transmission data to be transmitted from the transmitting apparatus 11 to the receiving apparatus 12, but other transmission data, such as frequency division multiplexing (FDM) signals or time division multiplexing (TDM) signals can be adopted other than the OFDM signal.

Figure 32:
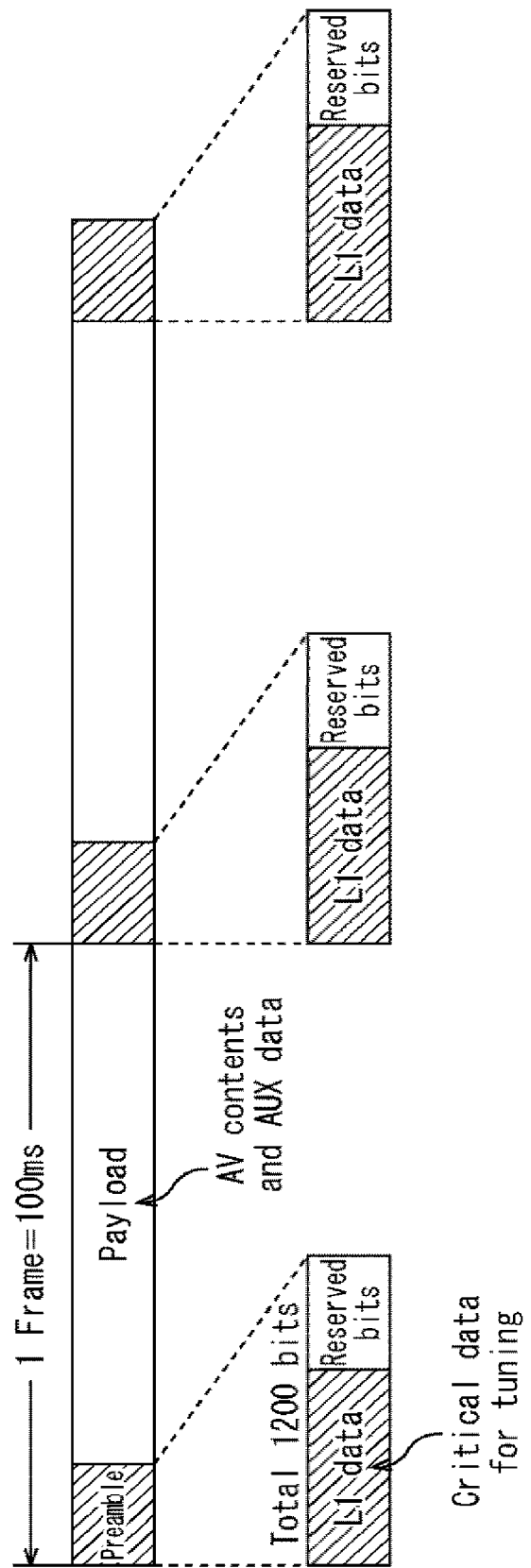
FIG. 32 illustrates an example of format of a TDM signal.

FIG. 32 illustrates an example of format of a TDM signal.

In FIG. 32, the TDM signal includes a frame in which a preamble and a payload are arranged in the illustrated order.

In FIG. 32, the preamble includes 1200 bits, some bits are assigned to L1 data, and the remaining bits are reserved bits for the future.

In the payload, image and sound data (AV content) and the like are arranged.

The preamble is physical layer data, and the data disposed in the payload is the upper layer data.

To adopt such a TDM signal as the transmission data, the processing index information can be provided as being included in the reserved bit of the preamble which is the physical layer data, and the relation table can be provided as being included in the payload which is the upper layer data.

<Description of Computer to which Present Technology is Applied>

Next, at least part of the above-described series of processing can be performed by hardware or software.

In a case where the series of processing steps is executed by software, a program forming the software is installed for example, in a general-purpose computer.

Figure 33:
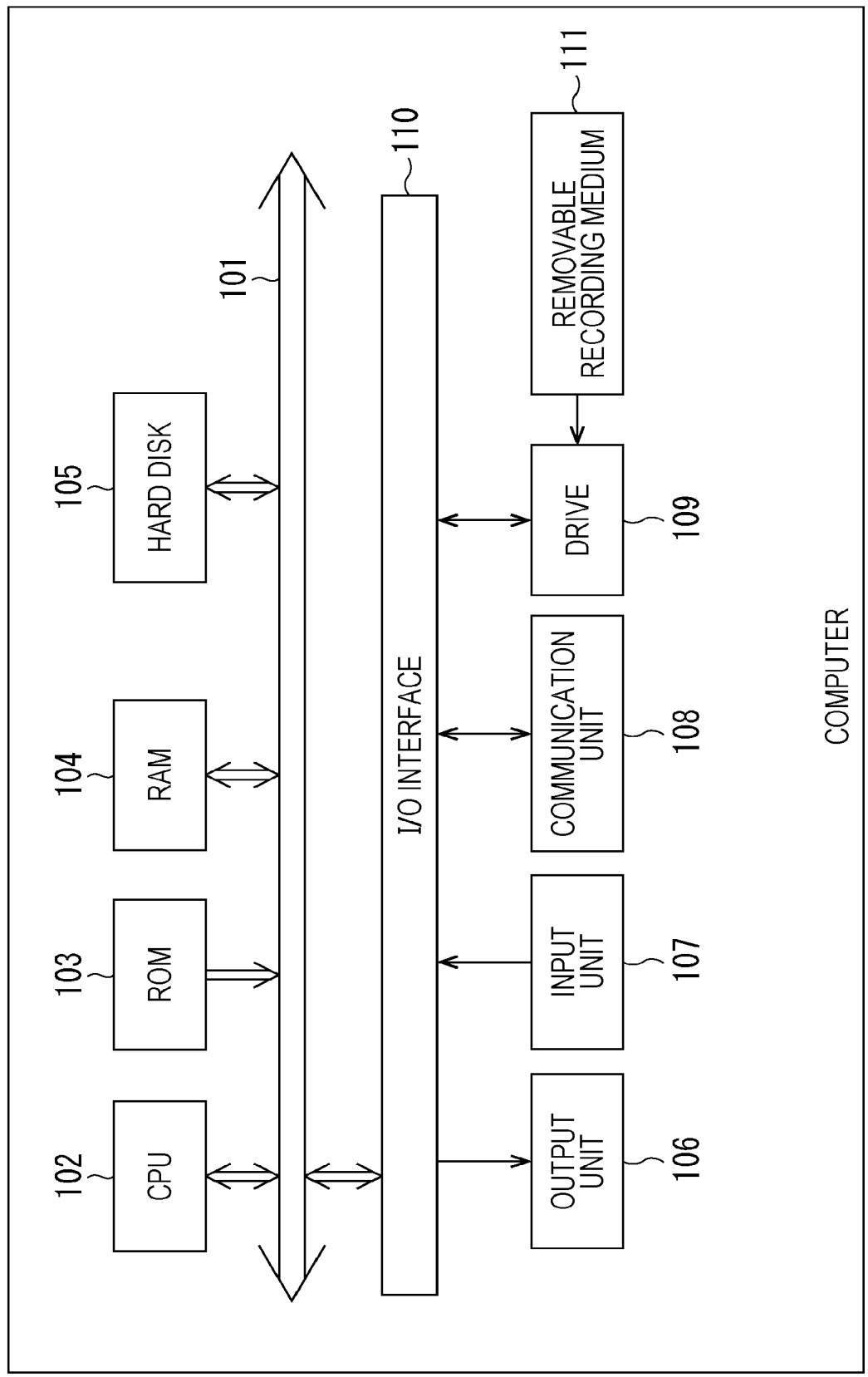
FIG. 33 is a block diagram illustrating a configuration example of a computer to which the present technology is applied according to an embodiment.

FIG. 33 is a block diagram illustrating a configuration example of an embodiment of a computer in which a program for executing the series of processing steps described above is installed.

The program can be recorded in advance in a hard disk 105 or a ROM 103 as a recording medium built in the computer.

Alternatively, the program can be stored (recorded) in the removable recording medium 111. Such a removable recording medium 111 can be provided as so-called package software. Examples of the removable recording medium 111 include, for example, a flexible disk, a CD-ROM (Compact Disc Read Only Memory), a MO (Magneto Optical) disk, a DVD (Digital Versatile Disc), a magnetic disk, a semiconductor memory, and the like.

It should be noted that, in addition to installing the program from the removable recording medium 111, as described above, on the computer, the program can be downloaded to the computer via a communication network or a broadcast network and installed in the built-in hard disk 105. In other words, the program can, for example, be wirelessly transferred from a download site to the computer via an artificial satellite for digital satellite broadcasting, or wired to the computer via a network such as a local area network (LAN) or the Internet.

The computer incorporates a central processing unit (CPU) 102, and an input/output interface 110 is connected to the CPU 102 via a bus 101.

Upon receipt of a command input by the user by manipulating an input unit 107 through the input/output interface 110, the CPU 102 executes the program stored in the read only memory (ROM) 103 according to the command being input. Alternatively, the CPU 102 loads a program stored in the hard disk 105 into a random access memory (RAM) 104 and executes the program.

Thus, the CPU 102 performs the processing according to the above-described flow chart or the above-described processing of the block diagram. Then, the CPU 102 outputs the processing result, for example, from the output unit 106 via the input/output interface 110, transmitted from the communication unit 108, or written in the hard disk 105, as necessary.

It should be noted that the input unit 107 includes a keyboard, a mouse, a microphone, and the like. In addition, the output unit 106 is configured by a liquid crystal display (LCD), a speaker, and the like.

Here, in this specification, the processing performed by the computer in accordance with the program does not necessarily be performed in chronological order in accordance with the order described in the flowchart. Specifically, the processing performed by the computer in accordance with the program also includes processing that is executed in parallel or individually (e.g., parallel processing or processing by an object).

In addition, the program may be processed by one computer (processor) or may be subject to distributed processing by a plurality of computers.

Moreover, in this specification, the system means a set of a plurality of constituent elements (devices, modules (parts), and the like), and it does not matter whether or not all the constituent elements are in the same casing. Therefore, both a plurality of apparatuses accommodated in separate housings and connected via a network and a single apparatus including a plurality of modules accommodated in a single casing are systems.

It should be noted that the embodiments of the present technology are not limited to the embodiments described above, and various changes may be made in a range without departing from the spirit of the present technology.

In addition, the steps described in the above-mentioned flowchart can be executed by a single apparatus or can be executed by a plurality of apparatuses in a distributed manner.

Further, in a case where a single step includes a plurality of processing steps, the plurality of processing steps included in the single step can be executed by a single apparatus or can be executed by a plurality of apparatuses in a distributed manner.

In addition, it should be noted that the present specification describes only an example effect not in a limiting manner, and an additional effect may also be provided.

It should be noted that the present technology may also be provided in the following configurations.

<1>

A transmitting apparatus, including:

a generating unit configured to generate transmission data including an index in data of a physical layer, the index being associated with predetermined processing-related information in a relation table in which processing-related information related to setting processing of tuning on a receiving side is registered in association with an index representing a region to be subjected to the setting processing corresponding to the processing-related information and provided as being included in data of an upper layer higher than the physical layer; and a transmitting unit configured to transmit the transmission data.

<2>

The transmitting apparatus according to <1>, in which the generating unit generates transmission data including the relation table in the data of the upper layer and the index in the data of the physical layer.

<3>

The transmitting apparatus according to <1>, in which the relation table is provided to the receiving side from a server.

<4>

The transmitting apparatus according to any one of <1> to <3>, in which the transmitting unit transmits the transmission data as FDM or TDM transmission data.

<5>

A transmitting method, including:

generating transmission data including an index in data of a physical layer, the index being associated with predetermined processing-related information in a relation table in which processing-related information related to setting processing of tuning on a receiving side is registered in association with an index representing a region to be subjected to the setting processing corresponding to the processing-related information and provided as being included in data of an upper layer higher than the physical layer; and transmitting the transmission data.

<6>

A receiving apparatus, including:

a relation table acquiring unit configured to acquire a relation table in which processing-related information related to setting processing of tuning on a receiving side is registered in association with an index representing a region to be subjected to the setting processing corresponding to the processing-related information and provided as being included in data of an upper layer higher than a physical layer;

a receiving unit configured to receive transmission data including an index in data of a physical layer, the index being associated with predetermined processing-related information in the relation table;

an index acquiring unit configured to acquire the index included in the data of the physical layer from the transmission data; and a processing execution unit configured to execute the setting processing corresponding to the processing-related information associated with the index included in the data of the physical layer in the relation table.

<7>

The receiving apparatus according to <6>, in which the transmission data includes the relation table in the data of the upper layer and the index in the data of the physical layer, and the relation table acquiring unit acquires the relation table included in the data of the upper layer from the transmission data.

<8>

The receiving apparatus according to <6>, in which the relation table acquiring unit acquires the relation table from a server.

<9>

The receiving apparatus according to any one of <6> to <8>, in which the receiving unit receives the transmission data as FDM or TDM transmission data.

<10>

A receiving method, including:

acquiring a relation table in which processing-related information related to setting processing of tuning on a receiving side is registered in association with an index representing a region to be subjected to the setting processing corresponding to the processing-related information and provided as being included in data of an upper layer higher than a physical layer;

receiving transmission data including an index in data of a physical layer, the index being associated with predetermined processing-related information in the relation table;

acquiring the index included in the data of the physical layer from the transmission data; and execute the setting processing corresponding to the processing-related information associated with the index included in the data of the physical layer in the relation table.

REFERENCE SIGNS LIST

11 Transmitting apparatus
12 Receiving apparatus
13 Output apparatus
14 Server
21 Upper layer processing unit
22 Physical layer processing unit
31 Upper layer data generating unit
32 Relation table generating unit
41 Control information generating unit
42 Transmission channel encoding unit
43 IFFT operation unit
44 GI adding unit
45 Transmitting unit
51 Physical layer processing unit
52 Upper layer processing unit
53 Storage unit
54 Processing index information acquiring unit
55 Processing execution unit
61 Tuner
62 ADC
63 Quadrature demodulation unit
64 FFT operation unit
65 Control information acquiring unit
66 Transmission channel decoding unit
71 DEMUX
72 Upper layer data processing unit
101 Bus
102 CPU
103 ROM
104 RAM
105 Hard disk
106 Output unit
107 Input unit
108 Communication unit
109 Drive
110 I/O interface
111 Removable recording medium

The invention claimed is:

1. A transmitting apparatus, comprising:
processing circuitry configured to:
generate transmission data that includes physical layer data at a physical layer of a protocol stack and upper layer data at a protocol layer of the protocol stack higher than the physical layer, the physical layer data including an index representing a region and associated with a piece of processing-related information in a relation table, the piece of processing-related information including tuning information applicable to the region, and the physical layer data being free from including the piece of processing-related information; and
transmit, by broadcasting, the transmission data.

2. The transmitting apparatus according to claim 1, wherein the processing circuitry is further configured to:
generate the transmission data to include the relation table in the upper layer data.

3. The transmitting apparatus according to claim 1, wherein the processing circuitry is further configured to:
provide the relation table to a server such that the relation table is obtainable from the server via a communication network.

4. The transmitting apparatus according to claim 1, wherein the processing circuitry is further configured to:
transmit the transmission data according to frequency division multiplexing (FDM) or time division multiplexing (TDM).

5. A transmitting method, comprising:
generating transmission data that includes physical layer data at a physical layer of a protocol stack and upper layer data at a protocol layer of the protocol stack higher than the physical layer, the physical layer data including an index representing a region and associated with a piece of processing-related information in a relation table, the piece of processing-related information including tuning information applicable to the region, and the physical layer data being free from including the piece of processing-related information; and
transmitting, by broadcasting, the transmission data.

6. A receiving apparatus, comprising:
a storage configured to store a relation table in which processing-related information is registered in association with at least one index representing at least one region; and
processing circuitry configured to:
receive, from broadcasting, transmission data that includes physical layer data at a physical layer of a protocol stack and upper layer data at a protocol layer of the protocol stack higher than the physical layer, the physical layer data including a received index representing a particular region and associated with a piece of processing-related information in the relation table, the piece of processing-related information including tuning information applicable to the particular region, and the physical layer data being free from including the piece of processing-related information;

obtain the received index included in the physical layer data from the transmission data;

obtain the piece of processing-related information from the relation table according to the received index; and configure the receiving apparatus according to the piece of processing-related information associated with the received index.

7. The receiving apparatus according to claim 6, wherein the transmission data includes the relation table in the upper layer data; and the processing circuitry is configured to obtain the relation table included in the upper layer data from the transmission data.

8. The receiving apparatus according to claim 6, wherein the processing circuitry is configured to obtain the relation table from a server via a communication network.

9. The receiving apparatus according to claim 6, wherein the processing circuitry is configured to receive the transmission data according to frequency division multiplexing (FDM) or time division multiplexing (TDM).

10. A receiving method, comprising:

storing, in a storage of a receiving apparatus, a relation table in which processing-related information is registered in association with at least one index representing at least one region;

receiving, from broadcasting, transmission data that includes physical layer data at a physical layer of a protocol stack and upper layer data at a protocol layer of the protocol stack higher than the physical layer, the physical layer data including a received index representing a particular region and associated with a piece of processing-related information in the relation table, the piece of processing-related information including tuning information applicable to the particular region, and the physical layer data being free from including the piece of processing-related information;

obtaining the received index included in the physical layer data from the transmission data;

obtaining the piece of processing-related information from the relation table according to the received index; and configuring, by processing circuitry of the receiving apparatus, the receiving apparatus according to the piece of processing-related information associated with the received index.

* * * * *